US012614350B2

(12) United States Patent
Lasserre

(10) Patent No.:  US 12,614,350 B2
(45) Date of Patent:  Apr. 28, 2026

(54) CENTROID POSITIONING FOR VOXELIZING TRIANGLES IN POINT CLOUD CODING

(71) Applicant: Comcast Cable Communications, LLC, Philadelphia, PA (US)

(72) Inventor: Sébastien Lasserre, Thorigné-Fouillard (FR)

(73) Assignee: Comcast Cable Communications, LLC, Philadelphia, PA (US)

( * ) Notice: Subject to any disclaimer, the term of this patent is extended or adjusted under 35 U.S.C. 154(b) by 155 days.

(21) Appl. No.: 18/634,112

(22) Filed: Apr. 12, 2024

(65) Prior Publication Data

US 2024/0346753 A1      Oct. 17, 2024

Related U.S. Application Data

(60) Provisional application No. 63/459,242, filed on Apr. 13, 2023.

(51) Int. Cl.
*G06T 17/00*      (2006.01)
*G06T 7/73*      (2017.01)
(52) U.S. Cl.
CPC .............. *G06T 17/00* (2013.01); *G06T 7/75* (2017.01)
(58) Field of Classification Search
CPC ........... G06T 17/00; G06T 7/75; G06T 9/001; H04N 19/593; H04N 19/597
See application file for complete search history.

(56) References Cited

U.S. PATENT DOCUMENTS

| | | | |
|---|---|---|---|
| 2020/0143589 A1 | 5/2020 | Sikachev | |
| 2021/0383605 A1 | 12/2021 | Peng et al. | |
| 2022/0417557 A1* | 12/2022 | Oh ............................ | G06T 9/40 |
| 2025/0016373 A1* | 1/2025 | Hendry .................. | H04N 19/31 |

FOREIGN PATENT DOCUMENTS

| | | | | | |
|---|---|---|---|---|---|
| CN | 104899883 B | * | 10/2017 | ............... | G06T 7/10 |
| WO | WO-2019242454 A1 | * | 12/2019 | ............. | G06T 13/40 |
| WO | WO-2024082108 A1 | * | 4/2024 | ............. | G06T 9/001 |

OTHER PUBLICATIONS

M59290, MPEG Meeting, Apr. 12-24, 2022, Source: Xiaomi, Sebastien Lasserre, Title: [GPCC][TriSoup] Part 3 Adding a residual for the centroid vertex.
ISO/IEC JTC 1/SC 29/WG 7 N506, Online, Jan. 2023, Source: WG 7, MPEG 3D Graphics and Haptics Coding, Title: G-PCC 2nd Edition Codec Description.
M59293, MPEG Meeting, Apr. 24-Apr. 29, 2022, Source: Xiaomi, Sebastien Lasserre, Title: [GPCC][TriSoup] Part 6 Compression of vertex presence flag and vertex position.

(Continued)

*Primary Examiner* — Maurice L. McDowell, Jr.
(74) *Attorney, Agent, or Firm* — Banner & Witcoff, Ltd.

(57)      ABSTRACT

A centroid and a plurality of points associated with a cuboid may form triangles to represent a portion of a point cloud, which represent an object or scene in content. Variations in the positions of points in the cuboid may shift the centroid's position, which may cause potential distortion. Optimizing the centroid's position, based on weighted points associated with the cuboid, may improve compression performance and rendering.

42 Claims, 20 Drawing Sheets

(56)     References Cited

OTHER PUBLICATIONS

ISO/IEC JTC 1/SC 29/WG 7 M61117: Maintz, Oct. 2022, Source: Panasonic Holdings Corporation, Title: [G-PCC] [New] Software modification on centroid generation on Trisoup.
M62526, MPEG Meeting, May 9, 2023, Source: Ofinno, Sebastien Lasserre, Title: [GPCC][EE13.60][EE13.50 related] On optimal centroid vertex positioning in TriSoup.
Jul. 17, 2024—PCT International Search Report—WO App. No. PCT/US2024/024248.

* cited by examiner $occW_{3,2} = 11110001$ $occW_{3,4} = 00010010$ $occW_{3,3} = 00001000$ $occW_{3,1} = 00110001$ $occW_{2,2} = 10011000$ $occW_{2,1} = 10000000$ $occW_{1,1} = 10000001$

414

402

408

410

406

412

400

404

$$u + v + w = 1$$
$$0 \leq u, v, w$$

$$P = uA + vB + wC$$

Figure 15:
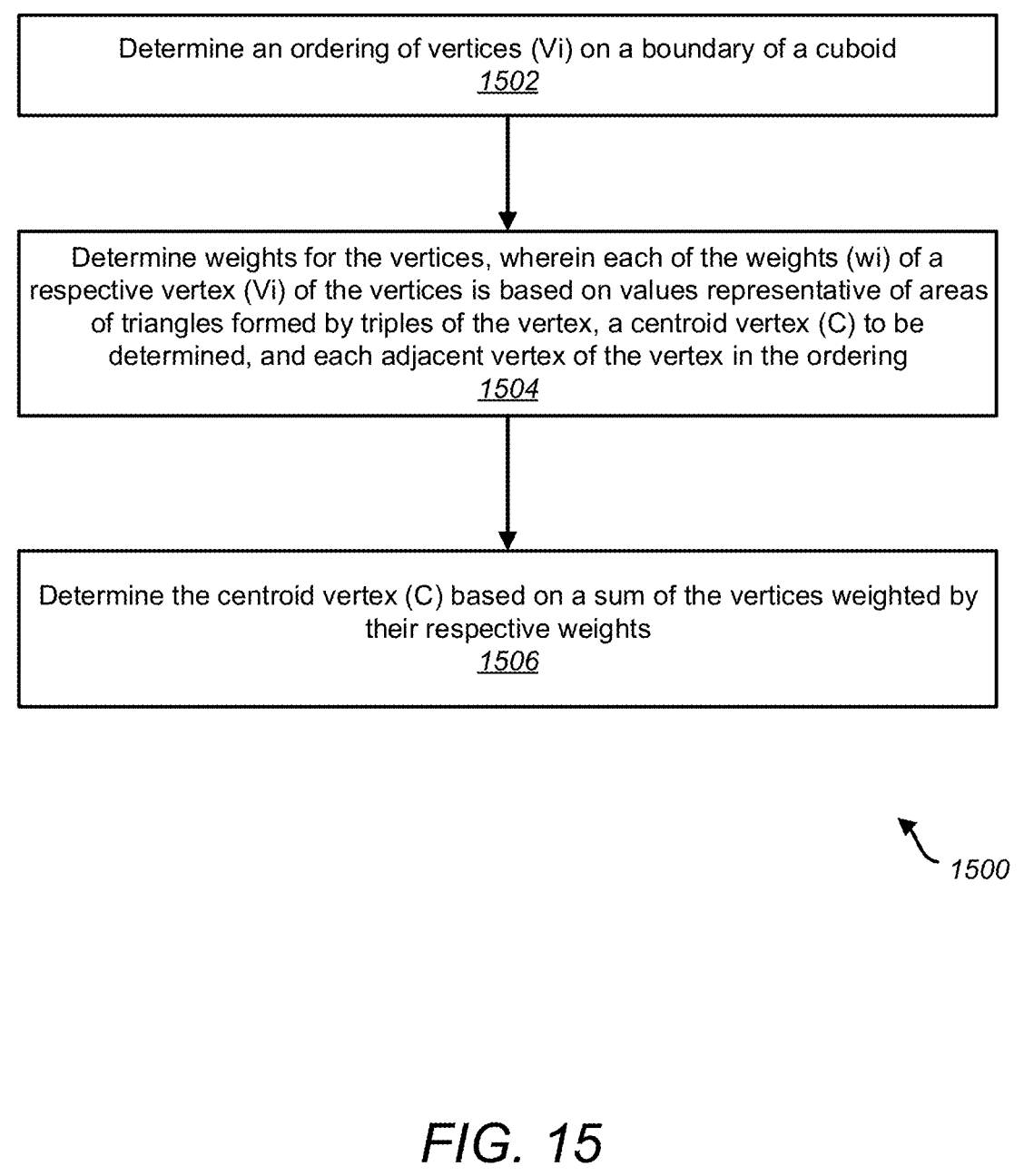

Determine an ordering of vertices (Vi) on a boundary of a cuboid
1502

Determine weights for the vertices, wherein each of the weights (wi) of a respective vertex (Vi) of the vertices is based on values representative of areas of triangles formed by triples of the vertex, a centroid vertex (C) to be determined, and each adjacent vertex of the vertex in the ordering
1504

Determine the centroid vertex (C) based on a sum of the vertices weighted by their respective weights
1506

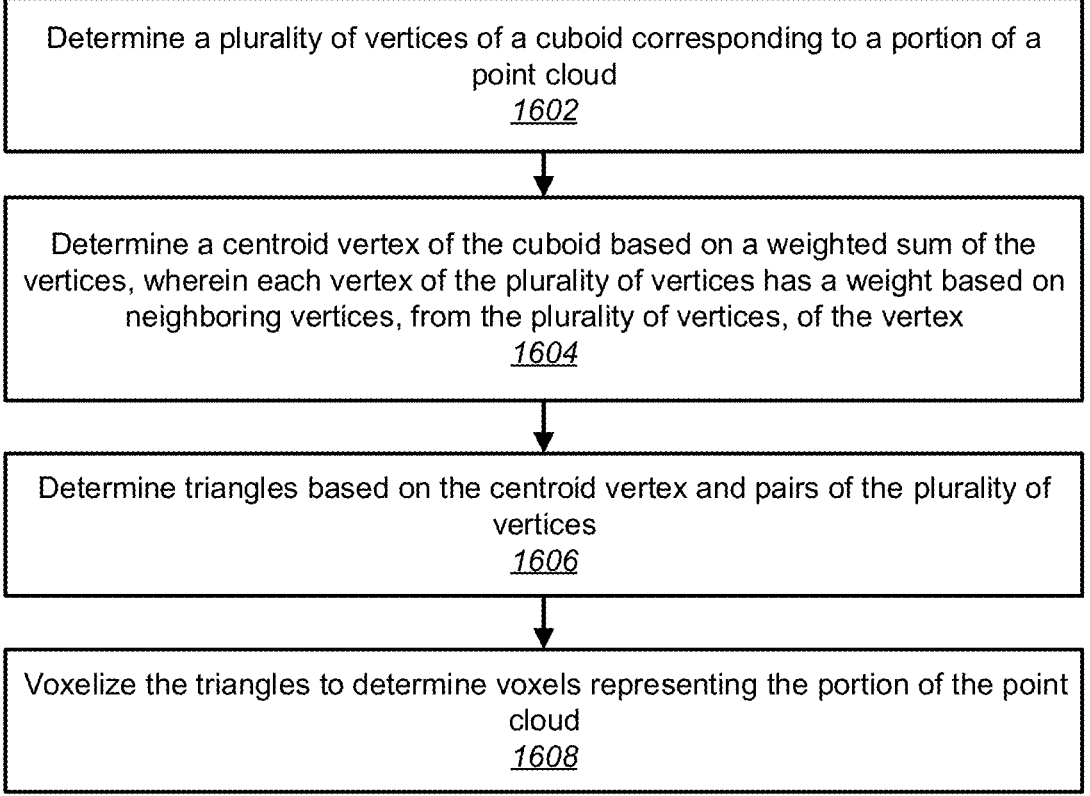

Determine a plurality of vertices of a cuboid corresponding to a portion of a
point cloud
*1602*

Determine a centroid vertex of the cuboid based on a weighted sum of the
vertices, wherein each vertex of the plurality of vertices has a weight based on
neighboring vertices, from the plurality of vertices, of the vertex
*1604*

Determine triangles based on the centroid vertex and pairs of the plurality of
vertices
*1606*

Voxelize the triangles to determine voxels representing the portion of the point
cloud
*1608*

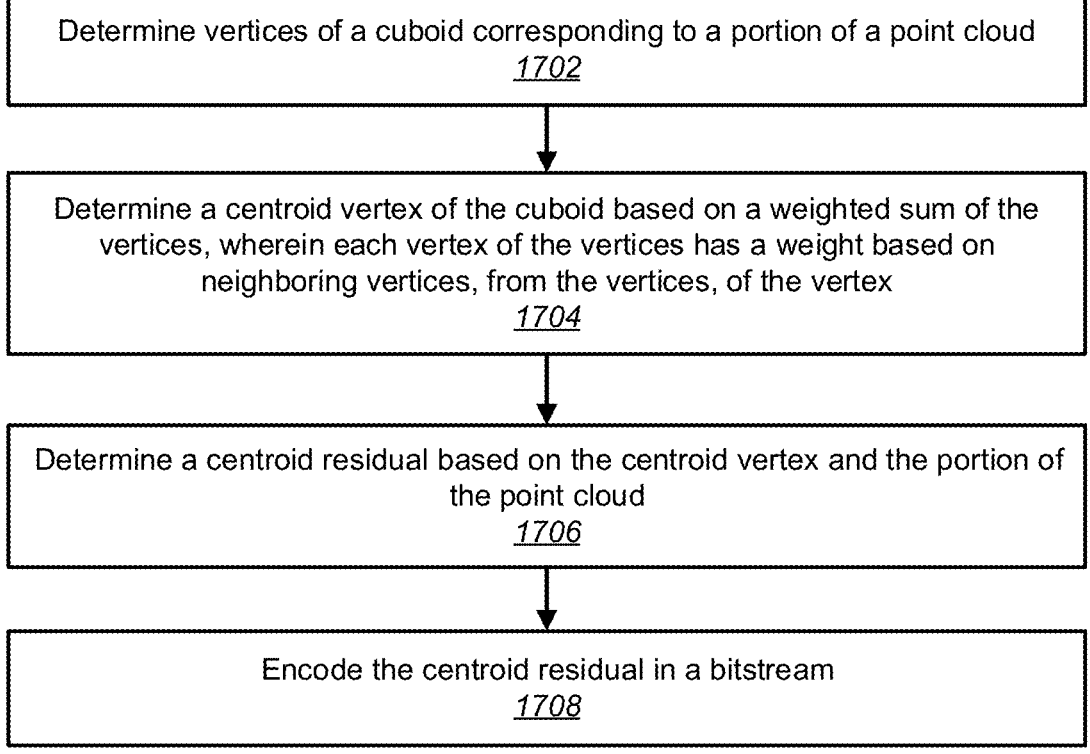

Determine vertices of a cuboid corresponding to a portion of a point cloud
*1702*

Determine a centroid vertex of the cuboid based on a weighted sum of the vertices, wherein each vertex of the vertices has a weight based on neighboring vertices, from the vertices, of the vertex
*1704*

Determine a centroid residual based on the centroid vertex and the portion of the point cloud
*1706*

Encode the centroid residual in a bitstream
*1708*

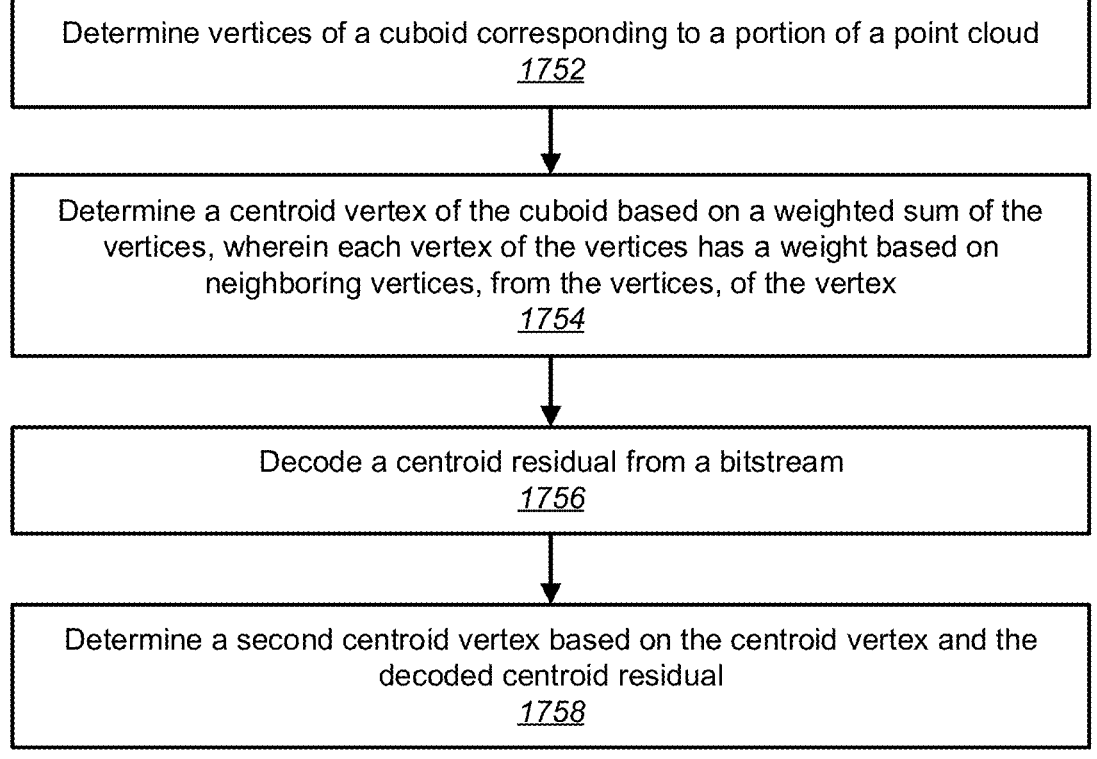

Determine vertices of a cuboid corresponding to a portion of a point cloud
_1752_

Determine a centroid vertex of the cuboid based on a weighted sum of the vertices, wherein each vertex of the vertices has a weight based on neighboring vertices, from the vertices, of the vertex
_1754_

Decode a centroid residual from a bitstream
_1756_

Determine a second centroid vertex based on the centroid vertex and the decoded centroid residual
_1758_

CENTROID POSITIONING FOR VOXELIZING TRIANGLES IN POINT CLOUD CODING

CROSS-REFERENCE TO RELATED APPLICATIONS

The application claims the benefit of U.S. Provisional Application No. 63/459,242 filed on Apr. 13, 2023. The above-referenced application is hereby incorporated by reference in its entirety.

BACKGROUND

An object or scene may be described using volumetric visual data comprising a series of points. The points may be stored as a point cloud format that includes a collection of points in three-dimensional space. As point clouds may get large in data size, transmitting and processing point cloud data may need a data compression method that is specifically designed with respect to the unique characteristics of point cloud data.

SUMMARY

The following summary presents a simplified summary of certain features. The summary is not an extensive overview and is not intended to identify key or critical elements.

A cuboid may comprise a centroid and a plurality of vertices. The centroid and the vertices may form triangles that may be used to represent a portion of a point cloud, which represents an object or scene in content. Variations in the positions of the vertices can lead to significant shift in the centroid's position, potentially causing distortion during coding (e.g., encoding or decoding). Assigning a weight to each vertex may adjust the centroid's position to be more equidistant from the vertices. These weights may be determined, for example, based on the areas of triangles formed between the centroid and the vertices, or the distances among the vertices. By determining an optimal position for the centroid, distortion in rendering may be reduced.

These and other features and advantages are described in greater detail below.

BRIEF DESCRIPTION OF THE DRAWINGS

Examples of several of the various embodiments of the present disclosure are described herein with reference to the drawings.

FIG. 15 shows an example method of determining a centroid vertex.

FIG. 16 shows an example method of obtaining a portion of a point cloud in a cuboid.

FIG. 17A shows an example method of encoding a centroid residual for a centroid vertex.

FIG. 17B shows an example method of decoding a centroid residual for a centroid vertex.

DETAILED DESCRIPTION

Figure 1:
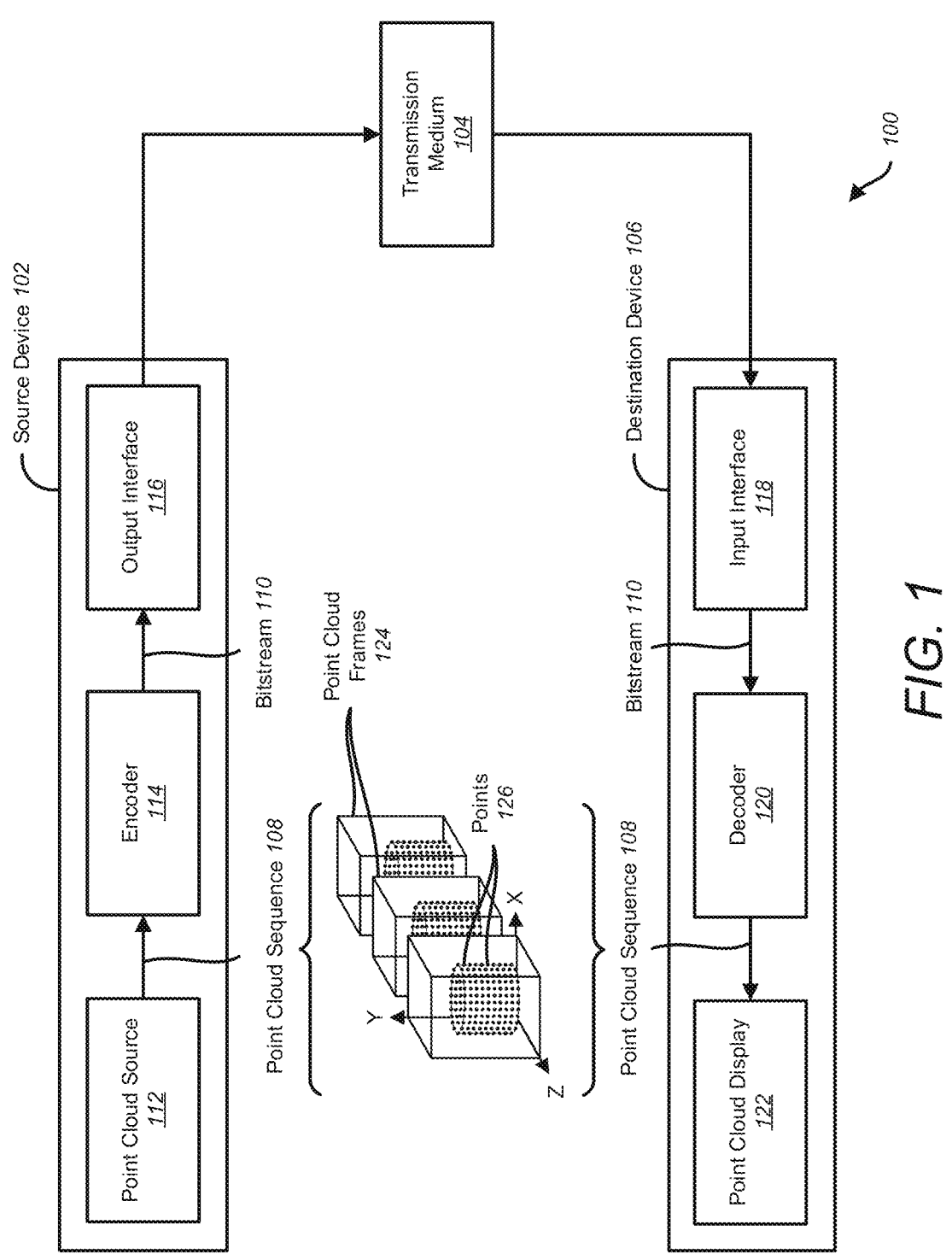
FIG. 1 shows an example point cloud coding system.

The accompanying drawings and descriptions provide examples. It is to be understood that the examples shown in the drawings and/or described are non-exclusive, and that features shown and described may be practiced in other examples. Examples are provided for operation of point cloud or point cloud sequence encoding or decoding systems. More particularly, the technology disclosed herein may relate to point cloud compression as used in encoding and/or decoding devices and/or systems.

At least some visual data may describe an object or scene in content and/or media using a series of points. Each point may comprise a position in two dimensions (x and y) and one or more optional attributes like color. Volumetric visual data may add another positional dimension to these visual data. For example, volumetric visual data may describe an object or scene in content and/or media using a series of points that each may comprise a position in three dimensions (x, y, and z) and one or more optional attributes like color, reflectance, time stamp, etc. Volumetric visual data may provide a more immersive way to experience visual data, for example, compared to the at least some visual data. For example, an object or scene described by volumetric visual data may be viewed from any (or multiple) angles, whereas the at least some visual data may generally only be viewed from the angle in which it was captured or rendered. As a format for the representation of visual data (e.g., volumetric visual data, three-dimensional video data, etc.) point clouds are versatile in their capability in representing all types of three-dimensional (3D) objects, scenes, and visual content. Point clouds are well suited for use in various applications including, among others: movie post-production, real-time 3D immersive media or telepresence, extended reality, free viewpoint video, geographical information systems, autonomous driving, 3D mapping, visualization, medicine, multi-view replay, and real-time Light Detection And Ranging (LIDAR) data acquisition.

As explained herein, volumetric visual data may be used in many applications, including extended reality (XR). XR encompasses various types of immersive technologies, including augmented reality (AR), virtual reality (VR), and mixed reality (MR). Volumetric visual data may be used in many applications, including augmented reality (AR), virtual reality (VR), and mixed reality (MR). Sparse volumetric visual data may be used in the automotive industry for the representation of three-dimensional (3D) maps (e.g., cartography) or as input to assisted driving systems. In the case of assisted driving systems, volumetric visual data may be typically input to driving decision algorithms. Volumetric visual data may be used to store valuable objects in digital form. In applications for preserving cultural heritage, a goal may be to keep a representation of objects that may be threatened by natural disasters. For example, statues, vases, and temples may be entirely scanned and stored as volumetric visual data having several billions of samples. This use-case for volumetric visual data may be particularly relevant for valuable objects in locations where earthquakes, tsunamis and typhoons are frequent. Volumetric visual data may take the form of a volumetric frame. The volumetric frame may describe an object or scene captured at a particular time instance. Volumetric visual data may take the form of a sequence of volumetric frames (referred to as a volumetric sequence or volumetric video). The sequence of volumetric frames may describe an object or scene captured at multiple different time instances.

Volumetric visual data may be stored in various formats. One format for storing volumetric visual data may be point clouds. A point cloud may comprise a collection of points in a 3D space. Such points may be used create a mesh comprising vertices and polygons, or other forms of visual content. As described herein, point cloud data may take the form of a point cloud frame, which describes an object or scene in content that is captured at a particular time instance. Point cloud data may take the form of a sequence of point cloud frames (e.g., point cloud video). As further described herein, point cloud data may be encoded by a source device (e.g., source device 102 as described herein with respect to FIG. 1) that outputs a bitstream containing the encoded point cloud data. The source device may encode the point cloud data based on point cloud compression coding, for example, geometry-based point cloud compression (G-PCC) coding and/or video-based point cloud compression (V-PCC) coding, or next generation coding. A destination device (e.g., destination device 106 as described herein with respect to FIG. 1) receives the bitstream containing the point cloud data and decodes the bitstream containing the point cloud data. The destination device may decode the point cloud data by performing point cloud decompression coding. The decompression coding may be an inverse process of the point cloud compression coding. The point cloud decompression coding may include, for example, G-PCC coding. Decoding may be used to decompress the point cloud data for display and/or other forms of consumption (e.g., further analysis, storage, etc.). The destination device (or a different device) may include, for example, a renderer for rendering the decoded point cloud data. The renderer may output content, for example, by rendering the point cloud data. The renderer may output content, for example, by rendering the point cloud data along with other data (e.g., audio data).

A point cloud may comprise a collection of points in 3D space. Each point in a point cloud may comprise geometry information that may indicate the point's position in 3D space. For example, the geometry information may indicate the point's position in 3D space, for example, using three Cartesian coordinates (x, y, and z) and/or using spherical coordinates (r, phi, theta) (e.g., if acquired by a rotating sensor). The positions of points in a point cloud may be quantized according to a space precision. The space precision may be the same or different in each dimension. The quantization process may create a grid in 3D space. One or more points residing within each sub-grid volume may be mapped to the sub-grid center coordinates, referred to as voxels. A voxel may be considered as a 3D extension of pixels corresponding to the 2D image grid coordinates. A point in a point cloud may comprise one or more types of attribute information. Attribute information may indicate a property of a point's visual appearance. For example, attribute information may indicate a texture (e.g., color) of the point, a material type of the point, transparency information of the point, reflectance information of the point, a normal vector to a surface of the point, a velocity at the point, an acceleration at the point, a time stamp indicating when the point was captured, or a modality indicating how the point was captured (e.g., running, walking, or flying). A point in a point cloud may comprise light field data in the form of multiple view-dependent texture information. Light field data may be another type of optional attribute information.

The points in a point cloud may describe an object or a scene. For example, the points in a point cloud may describe the external surface and/or the internal structure of an object or scene. The object or scene may be synthetically generated by a computer. The object or scene may be generated from the capture of a real-world object or scene. The geometry information of a real-world object or a scene may be obtained by 3D scanning and/or photogrammetry. 3D scanning may include different types of scanning, for example, laser scanning, structured light scanning, and/or modulated light scanning. 3D scanning may obtain geometry information. 3D scanning may obtain geometry information, for example, by moving one or more laser heads, structured light cameras, and/or modulated light cameras relative to an object or scene being scanned. Photogrammetry may obtain geometry information. Photogrammetry may obtain geometry information, for example, by triangulating the same feature or point in different spatially shifted 2D photographs. Point cloud data may take the form of a point cloud frame. The point cloud frame may describe an object or scene captured at a particular time instance. Point cloud data may take the form of a sequence of point cloud frames. The sequence of point cloud frames may be referred to as a point cloud sequence or point cloud video. The sequence of point cloud frames may describe an object or scene captured at multiple different time instances.

The data size of a point cloud frame or point cloud sequence may be excessive (e.g., too large) for storage and/or transmission in many applications. For example, a single point cloud may comprise over a million points or even billions of points. Each point may comprise geometry information and one or more optional types of attribute information. The geometry information of each point may comprise three Cartesian coordinates (x, y, and z) and/or spherical coordinates (r, phi, theta) that may be each represented, for example, using at least 10 bits per component or 30 bits in total. The attribute information of each point may comprise a texture corresponding to a plurality of (e.g., three) color components (e.g., R, G, and B color components). Each color component may be represented, for example, using 8-10 bits per component or 24-30 bits in total. For example, a single point may comprise at least 54 bits of information, with at least 30 bits of geometry information and at least 24 bits of texture. If a point cloud frame includes a million such points, each point cloud frame may require 54 million bits or 54 megabits to represent. For dynamic point clouds that change over time, at a frame rate of 30 frames per second, a data rate of 1.32 gigabits per second may be required to send (e.g., transmit) the points of the point cloud sequence. Raw representations of point clouds may require a large amount of data, and the practical deployment of point-cloud-based technologies may need compression technologies that enable the storage and distribution of point clouds with a reasonable cost.

Encoding may be used to compress and/or reduce the data size of a point cloud frame or point cloud sequence to provide for more efficient storage and/or transmission. Decoding may be used to decompress a compressed point cloud frame or point cloud sequence for display and/or other forms of consumption (e.g., by a machine learning based device, neural network-based device, artificial intelligence-based device, or other forms of consumption by other types of machine-based processing algorithms and/or devices). Compression of point clouds may be lossy (introducing differences relative to the original data) for the distribution to and visualization by an end-user, for example, on AR or VR glasses or any other 3D-capable device. Lossy compression may allow for a high ratio of compression but may imply a trade-off between compression and visual quality perceived by an end-user. Other frameworks, for example, frameworks for medical applications or autonomous driving, may require lossless compression to avoid altering the results of a decision obtained, for example, based on the analysis of the sent (e.g., transmitted) and decompressed point cloud frame.

FIG. 1 shows an example point cloud coding (e.g., encoding and/or decoding) system 100. Point cloud coding system 100 may comprise a source device 102, a transmission medium 104, and a destination device 106. Source device 102 may encode a point cloud sequence 108 into a bitstream 110 for more efficient storage and/or transmission. Source device 102 may store and/or send (e.g., transmit) bitstream 110 to destination device 106 via transmission medium 104. Destination device 106 may decode bitstream 110 to display point cloud sequence 108 or for other forms of consumption (e.g., further analysis, storage, etc.). Destination device 106 may receive bitstream 110 from source device 102 via a storage medium or transmission medium 104. Source device 102 and destination device 106 may include any quantity/number of different devices. Source device 102 and destination device 106 may include, for example, a cluster of interconnected computer systems acting as a pool of seamless resources (also referred to as a cloud of computers or cloud computer), a server, a desktop computer, a laptop computer, a tablet computer, a smart phone, a wearable device, a television, a camera, a video gaming console, a set-top box, a video streaming device, a vehicle (e.g., an autonomous vehicle), or a head-mounted display. A head-mounted display may allow a user to view a VR, AR, or MR scene and adjust the view of the scene, for example, based on movement of the user's head. A head-mounted display may be connected (e.g., tethered) to a processing device (e.g., a server, a desktop computer, a set-top box, or a video gaming console) or may be fully self-contained.

A source device 102 may comprise a point cloud source 112, an encoder 114, and an output interface 116. A source device 102 may comprise a point cloud source 112, an encoder 114, and an output interface 116, for example, to encode point cloud sequence 108 into a bitstream 110. Point cloud source 112 may provide (e.g., generate) point cloud sequence 108, for example, from a capture of a natural scene and/or a synthetically generated scene. A synthetically generated scene may be a scene comprising computer generated graphics. Point cloud source 112 may comprise one or more point cloud capture devices, a point cloud archive comprising previously captured natural scenes and/or synthetically generated scenes, a point cloud feed interface to receive captured natural scenes and/or synthetically generated scenes from a point cloud content provider, and/or a processor(s) to generate synthetic point cloud scenes. The point cloud capture devices may include, for example, one or more laser scanning devices, structured light scanning devices, modulated light scanning devices, and/or passive scanning devices.

Point cloud sequence 108 may comprise a series of point cloud frames 124 (e.g., an example shown in FIG. 1). A point cloud frame may describe an object or scene captured at a particular time instance. Point cloud sequence 108 may achieve the impression of motion by using a constant or variable time to successively present point cloud frames 124 of point cloud sequence 108. A point cloud frame may comprise a collection of points (e.g., voxels) 126 in 3D space. Each point 126 may comprise geometry information that may indicate the point's position in 3D space. The geometry information may indicate, for example, the point's position in 3D space using three Cartesian coordinates (x, y, and z). One or more of points 126 may comprise one or more types of attribute information. Attribute information may indicate a property of a point's visual appearance. For example, attribute information may indicate, for example, a texture (e.g., color) of a point, a material type of a point, transparency information of a point, reflectance information of a point, a normal vector to a surface of a point, a velocity at a point, an acceleration at a point, a time stamp indicating when a point was captured, a modality indicating how a point was captured (e.g., running, walking, or flying), etc. One or more of points 126 may comprise, for example, light field data in the form of multiple view-dependent texture information. Light field data may be another type of optional attribute information. Color attribute information of one or more of points 126 may comprise a luminance value and two chrominance values. The luminance value may represent the brightness (e.g., luma component, Y) of the point. The chrominance values may respectively represent the blue and red components of the point (e.g., chroma components, Cb and Cr) separate from the brightness. Other color attribute values may be represented, for example, based on different color schemes (e.g., an RGB or monochrome color scheme).

Encoder 114 may encode point cloud sequence 108 into a bitstream 110. To encode point cloud sequence 108, encoder 114 may use one or more lossless or lossy compression techniques to reduce redundant information in point cloud sequence 108. To encode point cloud sequence 108, encoder 114 may use one or more prediction techniques to reduce redundant information in point cloud sequence 108. Redundant information is information that may be predicted at a decoder 120 and may not be needed to be sent (e.g., transmitted) to decoder 120 for accurate decoding of point cloud sequence 108. For example, Motion Picture Expert Group (MPEG) introduced a geometry-based point cloud compression (G-PCC) standard (ISO/IEC standard 23090-9: Geometry-based point cloud compression). G-PCC specifies the encoded bitstream syntax and semantics for transmission and/or storage of a compressed point cloud frame and the decoder operation for reconstructing the compressed point cloud frame from the bitstream. During standardization of G-PCC, a reference software (ISO/IEC standard 23090-21: Reference Software for G-PCC) was developed to encode the geometry and attribute information of a point cloud frame. To encode geometry information of a point cloud frame, the G-PCC reference software encoder may perform voxelization. The G-PCC reference software encoder may perform voxelization, for example, by quantizing positions of points in a point cloud. Quantizing positions of points in a point cloud may create a grid in 3D space. The G-PCC reference software encoder may map the points to the center coordinates of the sub-grid volume (e.g., voxel) that their quantized locations reside in. The G-PCC reference software encoder may perform geometry analysis using an occupancy tree to compress the geometry information. The G-PCC reference software encoder may entropy encode the result of the geometry analysis to further compress the geometry information. To encode attribute information of a point cloud, the G-PCC reference software encoder may use a transform tool, such as Region Adaptive Hierarchical Transform (RAHT), the Predicting Transform, and/or the Lifting Transform. The Lifting Transform may be built on top of the Predicting Transform. The Lifting Transform may include an extra update/lifting step. The Lifting Transform and the Predicting Transform may be referred to as Predicting/Lifting Transform or pred lift. Encoder 114 may operate in a same or similar manner to an encoder provided by the G-PCC reference software.

Output interface 116 may be configured to write and/or store bitstream 110 onto transmission medium 104. The bitstream 110 may be sent (e.g., transmitted) to destination device 106. In addition or alternatively, output interface 116 may be configured to send (e.g., transmit), upload, and/or stream bitstream 110 to destination device 106 via transmission medium 104. Output interface 116 may comprise a wired and/or wireless transmitter configured to send (e.g., transmit), upload, and/or stream bitstream 110 according to one or more proprietary, open-source, and/or standardized communication protocols. The one or more proprietary, open-source, and/or standardized communication protocols may include, for example, Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one or more networks (e.g., the Internet) or file server(s) configured to store and/or send (e.g., transmit) encoded video data.

Destination device 106 may decode bitstream 110 into point cloud sequence 108 for display or other forms of consumption. Destination device 106 may comprise one or more of an input interface 118, a decoder 120, and/or a point cloud display 122. Input interface 118 may be configured to read bitstream 110 stored on transmission medium 104. Bitstream 110 may be stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary, open-source, standardized communication protocols, and/or any other communication protocol. Examples of the protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Decoder 120 may decode point cloud sequence 108 from encoded bitstream 110. For example, decoder 120 may operate in a same or similar manner as a decoder provided by G-PCC reference software. Decoder 120 may decode a point cloud sequence that approximates a point cloud sequence 108. Decoder 120 may decode a point cloud sequence that approximates a point cloud sequence 108 due to, for example, lossy compression of the point cloud sequence 108 by encoder 114 and/or errors introduced into encoded bitstream 110, for example, if transmission to destination device 106 occurs.

Point cloud display 122 may display a point cloud sequence 108 to a user. The point cloud display 122 may comprise, for example, a cathode rate tube (CRT) display, a liquid crystal display (LCD), a plasma display, a light emitting diode (LED) display, a 3D display, a holographic display, a head-mounted display, or any other display device suitable for displaying point cloud sequence 108.

Point cloud coding (e.g., encoding/decoding) system 100 is presented by way of example and not limitation. Point cloud coding systems different from the point cloud coding system 100 and/or modified versions of the point cloud coding system 100 may perform the methods and processes as described herein. For example, the point cloud coding system 100 may comprise other components and/or arrangements. Point cloud source 112 may, for example, be external to source device 102. Point cloud display device 122 may, for example, be external to destination device 106 or omitted altogether (e.g., if point cloud sequence 108 is intended for consumption by a machine and/or storage device). Source device 102 may further comprise, for example, a point cloud decoder. Destination device 106 may comprise, for example, a point cloud encoder. For example, source device 102 may be configured to further receive an encoded bit stream from destination device 106. Receiving an encoded bit stream from destination device 106 may support two-way point cloud transmission between the devices.

As described herein, an encoder may quantize the positions of points in a point cloud according to a space precision, which may be the same or different in each dimension of the points. The quantization process may create a grid in 3D space. The encoder may map any points residing within each sub-grid volume to the sub-grid center coordinates, referred to as a voxel or a volumetric pixel. A voxel may be considered as a 3D extension of pixels corresponding to 2D image grid coordinates.

An encoder may represent or code a voxelized point cloud. An encoder may represent or code a voxelized point cloud, for example, using an occupancy tree. For example, the encoder may split the initial volume or cuboid containing the voxelized point cloud into sub-cuboids. The initial volume or cuboid may be referred to as a bounding box. A cuboid may be, for example, a cube. The encoder may recursively split each sub-cuboid that contains at least one point of the point cloud. The encoder may not further split sub-cuboids that do not contain at least one point of the point cloud. A sub-cuboid that contains at least one point of the point cloud may be referred to as an occupied sub-cuboid. A sub-cuboid that does not contain at least one point of the point cloud may be referred to as an unoccupied sub-cuboid. The encoder may split an occupied sub-cuboid into, for example, two sub-cuboids (to form a binary tree), four sub-cuboids (to form a quadtree), or eight sub-cuboids (to form an octree). The encoder may split an occupied sub-cuboid to obtain further sub-cuboids. The sub-cuboids may have the same size and shape at a given depth level of the occupancy tree. The sub-cuboids may have the same size and shape at a given depth level of the occupancy tree, for example, if the encoder splits the occupied sub-cuboid along a plane passing through the middle of edges of the sub-cuboid.

The initial volume or cuboid containing the voxelized point cloud may correspond to the root node of the occupancy tree. Each occupied sub-cuboid, split from the initial volume, may correspond to a node (of the root node) in a second level of the occupancy tree. Each occupied sub-cuboid, split from an occupied sub-cuboid in the second level, may correspond to a node (off the occupied sub-cuboid in the second level from which it was split) in a third level of the occupancy tree. The occupancy tree structure may continue to form in this manner for each recursive split iteration until, for example, some maximum depth level of the occupancy tree is reached or each occupied sub-cuboid has a volume corresponding to one voxel.

Each non-leaf node of the occupancy tree may comprise or be associated with an occupancy word representing the occupancy state of the cuboid corresponding to the node. For example, a node of the occupancy tree corresponding to a cuboid that is split into 8 sub-cuboids may comprise or be associated with a 1-byte occupancy word. Each bit (referred to as an occupancy bit) of the 1-byte occupancy word may represent or indicate the occupancy of a different one of the eight sub-cuboids. Occupied sub-cuboids may be each represented or indicated by a binary "1" in the 1-byte occupancy word. Unoccupied sub-cuboids may be each represented or indicated by a binary "0" in the 1-byte occupancy word. Occupied and un-occupied sub-cuboids may be represented or indicated by opposite 1-bit binary values (e.g., a binary "0" representing or indicating an occupied sub-cuboid and a binary "1" representing or indicating an unoccupied sub-cuboid) in the 1-byte occupancy word.

Each bit of an occupancy word may represent or indicate the occupancy of a different one of the eight sub-cuboids. Each bit of an occupancy word may represent or indicate the occupancy of a different one of the eight sub-cuboids, for example, following the so-called Morton order. For example, the least significant bit of an occupancy word may represent or indicate, for example, the occupancy of a first one of the eight sub-cuboids following the Morton order. The second least significant bit of an occupancy word may represent or indicate, for example, the occupancy of a second one of the eight sub-cuboids following the Morton order, etc.

Figure 2:
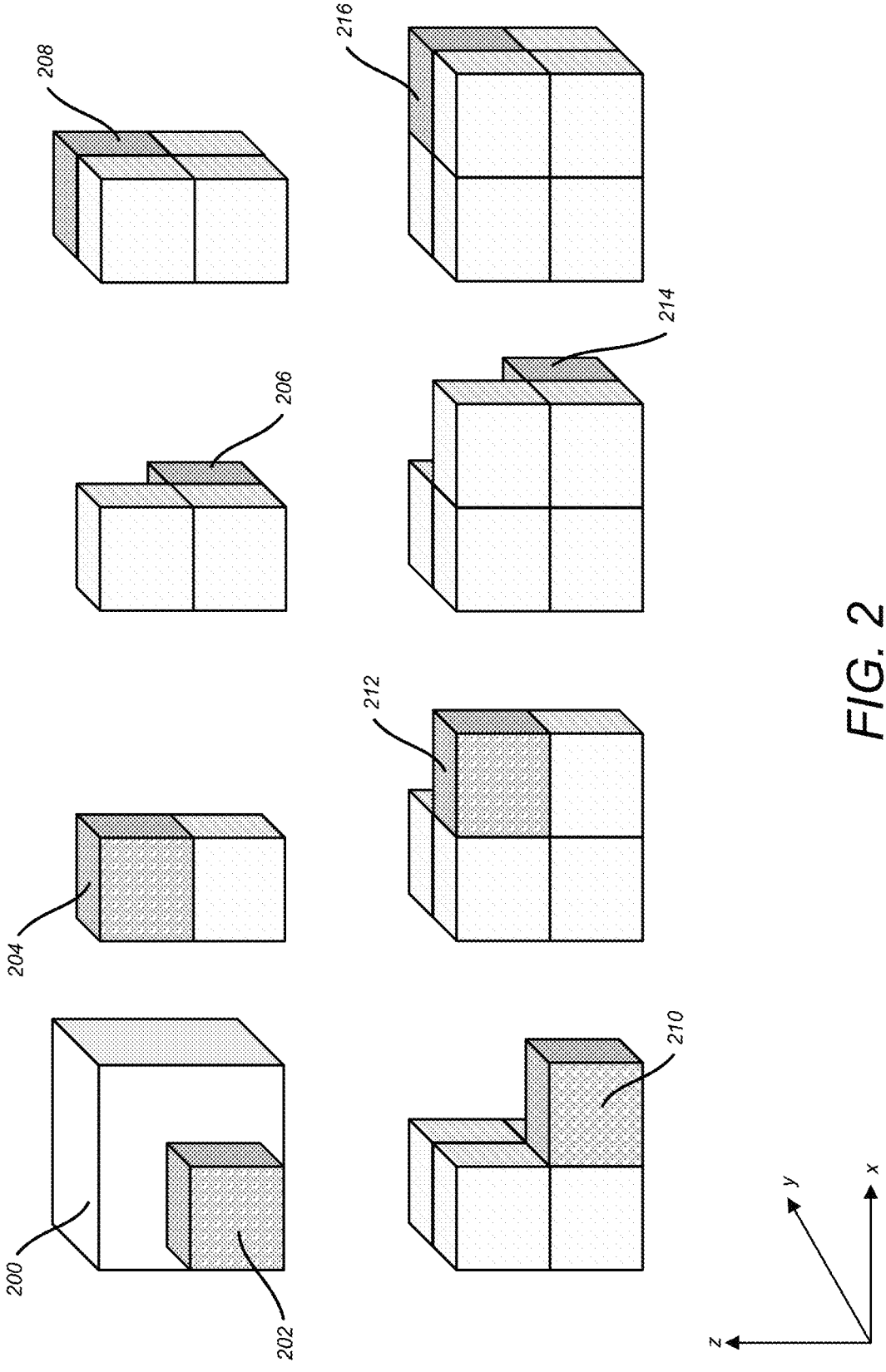
FIG. 2 shows an example Morton order.

FIG. 2 shows an example Morton order. More specifically, FIG. 2 shows a Morton order of eight sub-cuboids 202-216 split from a cuboid 200. Sub-cuboids 202-216 may be labeled, for example, based on their Morton order, with child node 202 being the first in Morton order and child node 216 being the last in Morton order. The Morton order for sub-cuboids 202-216 may be a local lexicographic order in xyz.

The geometry of a voxelized point cloud may be represented by, and may be determined from, the initial volume and the occupancy words of the nodes in an occupancy tree.

An encoder may send (e.g., transmit) the initial volume and the occupancy words of the nodes in the occupancy tree in a bitstream to a decoder for reconstructing the point cloud. The encoder may entropy encode the occupancy words. The encoder may entropy encode the occupancy words, for example, before sending (e.g., transmitting) the initial volume and the occupancy words of the nodes in the occupancy tree. The encoder may encode an occupancy bit of an occupancy word of a node corresponding to a cuboid. The encoder may encode an occupancy bit of an occupancy word of a node corresponding to a cuboid, for example, based on one or more occupancy bits of occupancy words of other nodes corresponding to cuboids that are adjacent or spatially close to the cuboid of the occupancy bit being encoded.

An encoder and/or a decoder may code (e.g., encode and/or decode) occupancy bits of occupancy words in sequence of a scan order. The scan order may also be referred to as a scanning order. For example, an encoder and/or a decoder may scan an occupancy tree in breadth-first order. All the occupancy words of the nodes of a given depth (e.g., level) within the occupancy tree may be scanned. All the occupancy words of the nodes of a given depth (e.g., level) within the occupancy tree may be scanned, for example, before scanning the occupancy words of the nodes of the next depth (e.g., level). Within a given depth, the encoder and/or decoder may scan the occupancy words of nodes in the Morton order. Within a given node, the encoder and/or decoder may scan the occupancy bits of the occupancy word of the node further in the Morton order.

Figure 3:
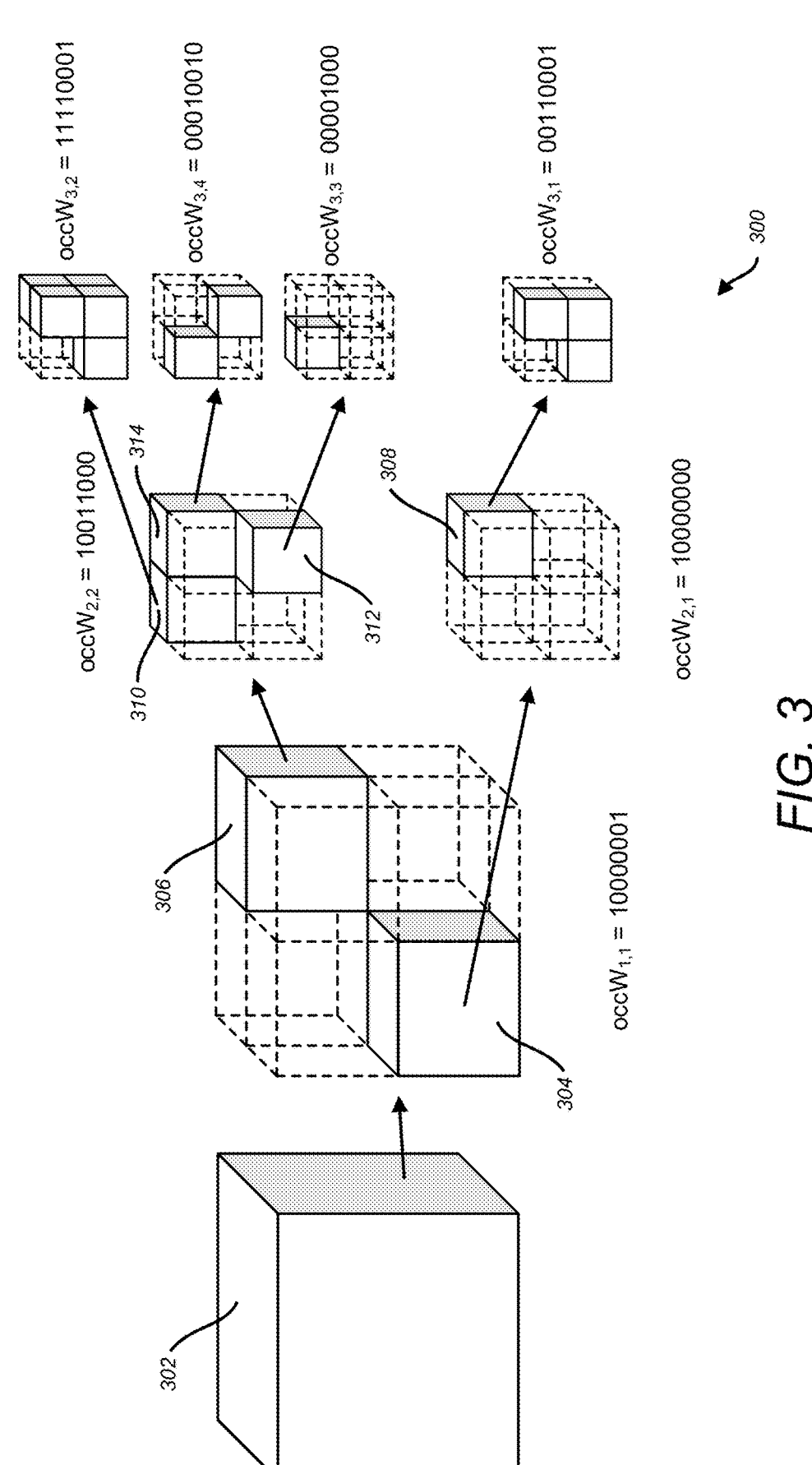
FIG. 3 shows an example scanning order.

FIG. 3 shows an example scanning order. FIG. 3 shows an example scanning order (e.g., breadth-first order as described herein) for an occupancy tree 300. More specifically, FIG. 3 shows a scanning order for the first three example levels of an occupancy tree 300. In FIG. 3, a cuboid (e.g., cube) 302 corresponding to a root node of the occupancy tree 300 may be divided into eight sub-cuboids (e.g., sub-cubes). Two sub-cuboids 304 and 306 of the eight sub-cuboids may be occupied. The other six sub-cuboids of the eight sub-cuboids may be unoccupied. Following the Morton order, a first eight-bit occupancy word (e.g., $occW_{1.1}$) may be constructed to represent the occupancy word of the root node. An (e.g., each) occupancy bit of the first eight-bit occupancy word (e.g., $occW_{1.1}$) may represent or indicate the occupancy of a sub-cube of the eight sub-cuboids in the Morton order. For example, the least significant occupancy bit of the first eight-bit occupancy word $occW_{1.1}$ may represent or indicate the occupancy of the first sub-cuboid of the eight sub-cuboids in the Morton order. The second least significant occupancy bit of the first eight-bit occupancy word $occW_{1.1}$ may represent or indicate the occupancy of the second sub-cuboid of the eight sub-cuboids in the Morton order, etc.

Each of occupied sub-cuboids (e.g., two occupied sub-cuboids 304 and 306) may correspond to a node off the root node in a second level of an occupancy tree 300. The occupied sub-cuboids (e.g., two occupied sub-cuboids 304 and 306) may be each further split into eight sub-cuboids. For example, one of the sub-cuboids 308 of the eight sub-cuboids split from the sub-cube 304 may be occupied, and the other seven sub-cuboids may be unoccupied. Three of the sub-cuboids 310, 312, and 314 of the eight sub-cuboids split from the sub-cube 306 may be occupied, and the other five sub-cuboids of the eight sub-cuboids split from the sub-cube 306 may be unoccupied. Two second eight-bit occupancy words $occW_{2.1}$ and $occW_{2.2}$ may be constructed in this order to respectively represent the occupancy word of the node corresponding to the sub-cuboid 304 and the occupancy word of the node corresponding to the sub-cuboid 306.

Each of occupied sub-cuboids (e.g., four occupied sub-cuboids 308, 310, 312, and 314) may correspond to a node in a third level of an occupancy tree 300. The occupied sub-cuboids (e.g., four occupied sub-cuboids 308, 310, 312, and 314) may be each further split into eight sub-cuboids or 32 sub-cuboids in total. For example, four third level eight-bit occupancy words $occW_{3.1}$, $occW_{3.2}$, $occW_{3.3}$ and $occW_{3.4}$ may be constructed in this order to respectively represent the occupancy word of the node corresponding to the sub-cuboid 308, the occupancy word of the node corresponding to the sub-cuboid 310, the occupancy word of the node corresponding to the sub-cuboid 312, and the occupancy word of the node corresponding to the sub-cuboid 314.

Occupancy words of an example occupancy tree 300 may be entropy coded (e.g., entropy encoded by an encoder and/or entropy decoded by a decoder), for example, following the scanning order discussed herein (e.g., Morton order). The occupancy words of the example occupancy tree 300 may be entropy coded (e.g., entropy encoded by an encoder and/or entropy decoded by a decoder) as the succession of the seven occupancy words $occW_{1.1}$ to $occW_{34}$, for example, following the scanning order discussed herein. The scanning order discussed herein may be a breadth-first scanning order. The occupancy word(s) of all node(s) having the same depth (or level) as a current parent node may have already been entropy coded, for example, if the occupancy word of a current child node belonging to the current parent node is being entropy coded. For example, the occupancy word(s) of all node(s) having the same depth (e.g., level) as the current child node and having a lower Morton order than the current child node may have also already been entropy coded. Part of the already coded occupancy word(s) may be used to entropy code the occupancy word of the current child node. The already coded occupancy word(s) of neighboring parent and child node(s) may be used, for example, to entropy code the occupancy word of the current child node. The occupancy bit(s) of the occupancy word having a lower Morton order than a particular occupancy bit may have also already been entropy coded and may be used to code the occupancy bit of the occupancy word of the current child node, for example, if the particular occupancy bit of the occupancy word of the current child node is being coded (e.g., entropy coded).

Figure 4:
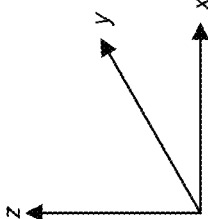
FIG. 4 shows an example neighborhood of cuboids with already-coded occupancy bits.

FIG. 4 shows an example neighborhood of cuboids for entropy coding the occupancy of a child cuboid. More specifically, FIG. 4 shows an example neighborhood of cuboids with already-coded occupancy bits. The neighborhood of cuboids with already-coded occupancy bits may be used to entropy code the occupancy bit of a current child cuboid 400. The neighborhood of cuboids with already-coded occupancy bits may be determined, for example, based on the scanning order of an occupancy tree representing the geometry of the cuboids in FIG. 4 as discussed herein. The neighborhood of cuboids, of a current child cuboid, may include one or more of: a cuboid adjacent to the current child cuboid, a cuboid sharing a vertex with the current child cuboid, a cuboid sharing an edge with the current child cuboid, a cuboid sharing a face with the current child cuboid, a parent cuboid adjacent to the current child cuboid, a parent cuboid sharing a vertex with the current child cuboid, a parent cuboid sharing an edge with the current child cuboid, a parent cuboid sharing a face with the current child cuboid, a parent cuboid adjacent to the current parent cuboid, a parent cuboid sharing a vertex with the current parent cuboid, a parent cuboid sharing an edge with the current parent cuboid, a parent cuboid sharing a face with the current parent cuboid, etc. As shown in FIG. 4, current child cuboid 400 may belong to a current parent cuboid 402. Following the scanning order of the occupancy words and occupancy bits of nodes of the occupancy tree, the occupancy bits of four child cuboids 404, 406, 408, and 410, belonging to the same current parent cuboid 402, may have already been coded. The occupancy bit of child cuboids 412 of preceding parent cuboids may have already been coded. The occupancy bits of parent cuboids 414, for which the occupancy bits of child cuboids have not already been coded, may have already been coded. The already-coded occupancy bits of cuboids 404, 406, 408, 410, 412, and 414 may be used to code the occupancy bit of the current child cuboid 400.

The number (e.g., quantity) of possible occupancy configurations (e.g., sets of one or more occupancy words and/or occupancy bits) for a neighborhood of a current child cuboid may be $2^N$, where N is the number (e.g., quantity) of cuboids in the neighborhood of the current child cuboid with already-coded occupancy bits. The neighborhood of the current child cuboid may comprise several dozens of cuboids. The neighborhood of the current child cuboid (e.g., several dozens of cuboids) may comprise 26 adjacent parent cuboids sharing a face, an, edge, and/or a vertex with the parent cuboid of the current child cuboid and also several adjacent child cuboids having occupancy bits already coded sharing a face, an edge, or a vertex with the current child cuboid. The occupancy configuration for a neighborhood of the current child cuboid may have billions of possible occupancy configurations, even limited to a subset of the adjacent cuboids, making its direct use impractical. An encoder and/or decoder may use the occupancy configuration for a neighborhood of the current child cuboid to select the context (e.g., a probability model), among a set of contexts, of a binary entropy coder (e.g., binary arithmetic coder) that may code the occupancy bit of the current child cuboid. The context-based binary entropy coding may be similar to the Context Adaptive Binary Arithmetic Coder (CABAC) used in MPEG-H Part 2 (also known as High Efficiency Video Coding (HEVC)).

An encoder and/or a decoder may use several methods to reduce the occupancy configurations for a neighborhood of a current child cuboid being coded to a practical number (e.g., quantity) of reduced occupancy configurations. The $2^6$ or 64 occupancy configurations of the six adjacent parent cuboids sharing a face with the parent cuboid of the current child cuboid may be reduced to 9 occupancy configurations. The occupancy configurations may be reduced by using geometry invariance. An occupancy score for the current child cuboid may be obtained from the $2^{26}$ occupancy configurations of the 26 adjacent parent cuboids. The score may be further reduced into a ternary occupancy prediction (e.g., "predicted occupied," "unsure", or "predicted unoccupied") by using score thresholds. The number (e.g., quantity) of occupied adjacent child cuboids and the number (e.g., quantity) of unoccupied adjacent child cuboids may be used instead of the individual occupancies of these child cuboids.

An encoder and/or a decoder using/employing one or more of the methods described herein may reduce the number (e.g., quantity) of possible occupancy configurations for a neighborhood of a current child cuboid to a more manageable number (e.g., a few thousands). It has been observed that instead of associating a reduced number (e.g., quantity) of contexts (e.g., probability models) directly to
the reduced occupancy configurations, another mechanism
may be used, namely Optimal Binary Coders with Update on
the Fly (OBUF). An encoder and/or a decoder may imple-
ment OBUF to limit the number (e.g., quantity) of contexts
to a lower number (e.g., 32 contexts).

OBUF may use a limited number (e.g., 32) of contexts
(e.g., probability models). The number (e.g., quantity) of
contexts in OBUF may be a fixed number (e.g., fixed
quantity). The contexts used by OBUF may be ordered,
referred to by a context index (e.g., a context index in the
range of 0 to 31), and associated from a lowest virtual
probability to a highest virtual probability to code a "1". A
Look-Up Table (LUT) of context indices may be initialized
at the beginning of a point cloud coding process. For
example, the LUT may initially point to a context (e.g., with
a context index 15) with the median virtual probability to
code a "1" for all input. The LUT may initially point to a
context with the median virtual probability to code a "1",
among the limited number (e.g., quantity) of contexts, for all
input. This LUT may take an occupancy configuration for a
neighborhood of current child cuboid as input and output the
context index associated with the occupancy configuration.
The LUT may have as many entries as reduced occupancy
configurations (e.g., around a few thousand entries). The
coding of the occupancy bit of a current child cuboid may
comprise steps including determining the reduced occu-
pancy configuration of the current child node, obtaining a
context index by using the reduced occupancy configuration
as an entry to the LUT, coding the occupancy bit of the
current child cuboid by using the context pointed to (or
indicated) by the context index, and updating the LUT entry
corresponding to the reduced occupancy configuration, for
example, based on the value of the coded occupancy bit of
the current child cuboid. The LUT entry may be decreased
to a lower context index value, for example, if a binary "0"
(e.g., indicating the current child cuboid is unoccupied) is
coded. The LUT entry may be increased to a higher context
index value, for example, if a binary "1" (e.g., indicating the
current child cuboid is occupied) is coded. The update
process of the context index may be, for example, based on
a theoretical model of optimal distribution for virtual prob-
abilities associated with the limited number (e.g., quantity)
of contexts. This virtual probability may be fixed by a model
and may be different from the internal probability of the
context that may evolve, for example, if the coding of bits
of data occurs. The evolution of the internal context may
follow a well-known process similar to the process in
CABAC.

An encoder and/or a decoder may implement a "dynamic
OBUF" scheme. The "dynamic OBUF" scheme may enable
an encoder and/or a decoder to handle a much larger number
(e.g., quantity) of occupancy configurations for a neighbor-
hood of a current child cuboid, for example, than general
OBUF. The use of a larger number (e.g., quantity) of
occupancy configurations for a neighborhood of a current
child cuboid may lead to improved compression capabilities,
and may maintain complexity within reasonable bounds. By
using an occupancy tree compressed by OBUF, an encoder
and/or a decoder may reach a lossless compression perfor-
mance as good as 1 bit per point (bpp) for coding the
geometry of dense point clouds. An encoder and/or a
decoder may implement dynamic OBUF to potentially fur-
ther reduce the bit rate by more than 25% to 0.7 bpp.

OBUF may not take as input a large variety of reduced
occupancy configurations for a neighborhood of a current
child cuboid, and may potentially cause a loss of useful
correlation. With OBUF, the size of the LUT of context
indices may be increased to handle more various occupancy
configurations for a neighborhood of a current child cuboid as input. Due to such increase, statistics may be diluted, and
compression performance may be worsened. For example, if
the LUT has millions of entries and the point cloud has a
hundred thousand points, then most of the entries may be
never visited (e.g., looked up, accessed, etc.). Many entries
may be visited only a few times and their associated context
index may not be updated enough times to reflect any
meaningful correlation between the occupancy configura-
tion value and the probability of occupancy of the current
child cuboid. Dynamic OBUF may be implemented to
mitigate the dilution of statistics due to the increase of the
number (e.g., quantity) of occupancy configurations for a
neighborhood of a current child cuboid. This mitigation may
be performed by a "dynamic reduction" of occupancy con-
figurations in dynamic OBUF.

Dynamic OBUF may add an extra step of reduction of
occupancy configurations for a neighborhood of a current
child cuboid, for example, before using the LUT of context
indices. This step may be called a dynamic reduction
because it evolves, for example, based on the progress of the
coding of the point cloud or, more precisely, based on
already visited (e.g., looked up in the LUT) occupancy
configurations.

As discussed herein, many possible occupancy configu-
rations for a neighborhood of a current child cuboid may be
potentially involved but only a subset may be visited if the
coding of a point cloud occurs. This subset may characterize
the type of the point cloud. For example, most of the visited
occupancy configurations may exhibit occupied adjacent
cuboids of a current child cuboid, for example, if AR or VR
dense point clouds are being coded. On the other hand, most
of the visited occupancy configurations may exhibit only a
few occupied adjacent cuboids of a current child cuboid, for
example, if sensor-acquired sparse point clouds are being
coded. The role of the dynamic reduction may be to obtain
a more precise correlation, for example, based on the most
visited occupancy configuration while putting aside (e.g.,
reducing aggressively) other occupancy configurations that
are much less visited. The dynamic reduction may be
updated on-the-fly. The dynamic reduction may be updated
on-the-fly, for example, after each visit (e.g., a lookup in the
LUT) of an occupancy configuration, for example, if the
coding of occupancy data occurs.

Figure 5:
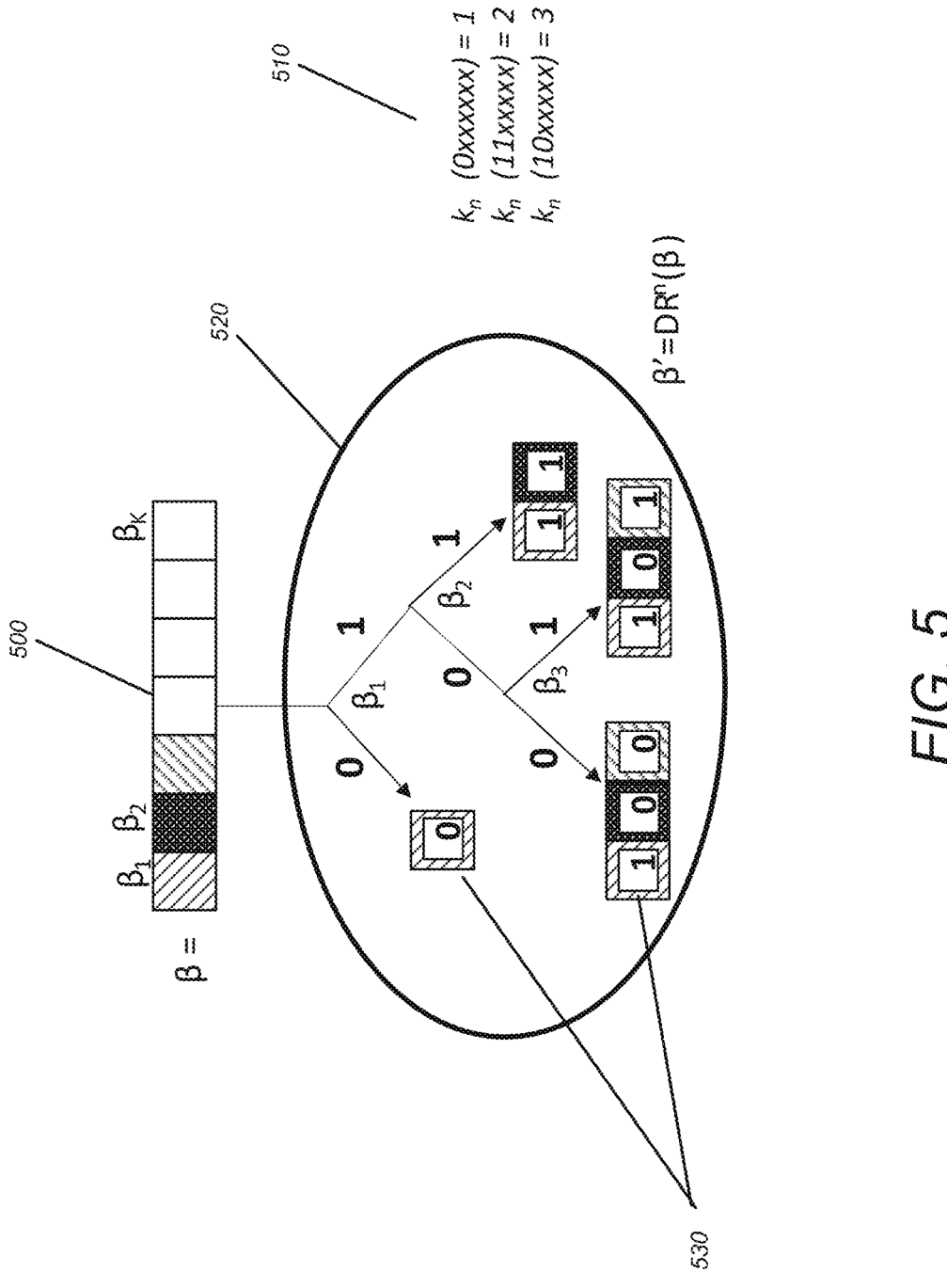
FIG. 5 shows an example of a dynamic reduction function DR that may be used in dynamic Optimal Binary Coders with Update on the Fly (OBUF).

FIG. 5 shows an example of a dynamic reduction function
DR that may be used in dynamic OBUF. The dynamic
reduction function DR may be obtained by masking bits $\beta_j$
of occupancy configurations 500

$$\beta = \beta_1 \ldots \beta_K$$

made of K bits. The size of the mask may decrease, for
example, if occupancy configurations are visited (e.g.,
looked up in the LUT) a certain number (e.g., quantity) of
times. The initial dynamic reduction function $DR^0$ may mask
all bits for all occupancy configurations such that it is a
constant function $DR^0(\beta)=0$ for all occupancy configura-
tions $\beta$. The dynamic reduction function may evolve from a
function $DR^n$ to an updated function $DR^{n+1}$. The dynamic
reduction function may evolve from a function $DR^n$ to an
updated function $DR^{n+1}$, for example, after each coding of
an occupancy bit. The function may be defined by $$\beta' = DR^n(\beta) = \beta_1 \ldots \beta_{kn(\beta)}$$

where $k_n(\beta)$ 510 is the number (e.g., quantity) of non-
masked bits. The initialization of $DR^0$ may correspond to $k_0(\beta) = 0$, and the natural evolution of the reduction function toward finer statistics may lead to an increasing number (e.g., quantity) of non-masked bits $k_n(\beta) \leq k_{n+1}(\beta)$. The dynamic reduction function may be entirely determined by the values of $k_n$ for all occupancy configurations $\beta$.

The visits (e.g., instances of a lookup in the LUT) to occupancy configurations may be tracked by a variable NV ($\beta'$) for all dynamically reduced occupancy configurations $\beta' = DR^n(\beta)$. The corresponding number (e.g., quantity) of visits NV ($\beta^V$) may be increased by one, for example, after each instance of coding of an occupancy bit based on an occupancy configuration $\beta^V$. If this number (e.g., quantity) of visits NV ($\beta^V$) is greater than a threshold $th_V$, $$NV(\beta^{V'}) > th_V$$

then the number (e.g., quantity) of unmasked bits $k_n(\beta)$ may be increased by one for all occupancy configurations $\beta$ being dynamically reduced to $\beta^V$. This corresponds to replacing the dynamically reduced occupancy configuration $\beta^{V'}$ by the two new dynamically reduced occupancy configurations $\beta^{0'}$ and $\beta^{1'}$ defined by $$\beta^{0'} = \beta^{V'} 0 = \beta_1^V \ldots \beta_{kn(\beta)}^V 0 \text{ and } \beta^{1'} = \beta^{V'} 1 = \beta_1^V \ldots \beta_{kn(\beta)}^V 1.$$

In other words, the number (e.g., quantity) of unmasked bits has been increased by one $k_{n+1}(\beta) = k_n(\beta) + 1$ for all occupancy configurations $\beta$ such that $DR^n(\beta) = \beta^{V'}$. The number (e.g., quantity) of visits of the two new dynamically reduced occupancy configurations may be initialized to zero $$NV(\beta^{0'}) = NV(\beta^{1'}) = 0. \quad \text{(I)}$$

At the start of the coding, the initial number (e.g., quantity) of visits for the initial dynamic reduction function $DR^0$ may be set to $$NV(DR^0(\beta)) = NV(0) = 0,$$

and the evolution of NV on dynamically reduced occupancy configurations may be entirely defined.

The corresponding LUT entry LUT[$\beta^{V'}$] may be replaced by the two new entries LUT[$\beta^{0'}$] and LUT[$\beta^{1'}$] that are initialized by the coder index associated with $\beta^{V'}$. The corresponding LUT entry LUT[$\beta^{V'}$] may be replaced by the two new entries LUT[$\beta^{0'}$] and LUT[$\beta^{1'}$] that are initialized by the coder index associated with $\beta^{V'}$, for example, if a dynamically reduced occupancy configuration $\beta^{V'}$ is replaced by the two new dynamically reduced occupancy configurations $\beta^{0'}$ and $\beta^{1'}$, $$LUT[\beta^{0'}] = LUT[\beta^{1'}] = LUT[\beta^{V'}], \quad \text{(II)}$$

and then evolve separately. The evolution of the LUT of coder indices on dynamically reduced occupancy configurations may be entirely defined.

The reduction function $DR^n$ may be modeled by a series of growing binary trees $T^n$ 520 whose leaf nodes 530 are the reduced occupancy configurations $\beta' = DR^n(\beta)$. The initial tree may be the single root node associated with $0 = DR^0(\beta)$. The replacement of the dynamically reduced to $\beta^{V'}$ by $\beta^{0'}$ and $\beta^{1'}$ may correspond to growing the tree $T^n$ from the leaf node associated with $\beta^{V'}$, for example, by attaching to it two new nodes associated with $\beta^{0'}$ and $\beta^{1'}$. The tree $T^{n+1}$ may be obtained by this growth. The number (e.g., quantity) of visits NV and the LUT of context indices may be defined on the leaf nodes and evolve with the growth of the tree through equations (I) and (II).

The practical implementation of dynamic OBUF may be made by the storage of the array NV [$\beta'$] and the LUT[$\beta'$] of context indices, as well as the trees $T^n$ 520. An alternative to the storage of the trees may be to store the array $k_n[\beta]$ 510 of the number (e.g., quantity) of non-masked bits.

A limitation for implementing dynamic OBUF may be its memory footprint. In some applications, a few million occupancy configurations may be practically handled, leading to about 20 bits $\beta_i$ constituting an entry configuration $\beta$ to the reduction function DR. Each bit $\beta_i$ may correspond to the occupancy status of a neighboring cuboid of a current child cuboid or a set of neighboring cuboids of a current child cuboid.

Higher (e.g., more significant) bits $\beta_i$ (e.g., $\beta_0$, $\beta_1$, etc.) may be the first bits to be unmasked. Higher (e.g., more significant) bits $\beta_i$ (e.g., $\beta_0$, $\beta_1$, etc.) may be the first bits to be unmasked, for example, during the evolution of the dynamic reduction function DR. The order of neighbor-based information put in the bits $\beta_i$ may impact the compression performance. Neighboring information may be ordered from higher (e.g., highest) priority to lower priority and put in this order into the bits $\beta_i$, from higher to lower weight. The priority may be, from the most important to the least important, occupancy of sets of adjacent neighboring child cuboids, then occupancy of adjacent neighboring child cuboids, then occupancy of adjacent neighboring parent cuboids, then occupancy of non-adjacent neighboring child nodes, and finally occupancy of non-adjacent neighboring parent nodes. Adjacent nodes sharing a face with the current child node may also have higher priority than adjacent nodes sharing an edge (but not sharing a face) with the current child node. Adjacent nodes sharing an edge with the current child node may have higher priority than adjacent nodes sharing only a vertex with the current child node.

Figure 6:
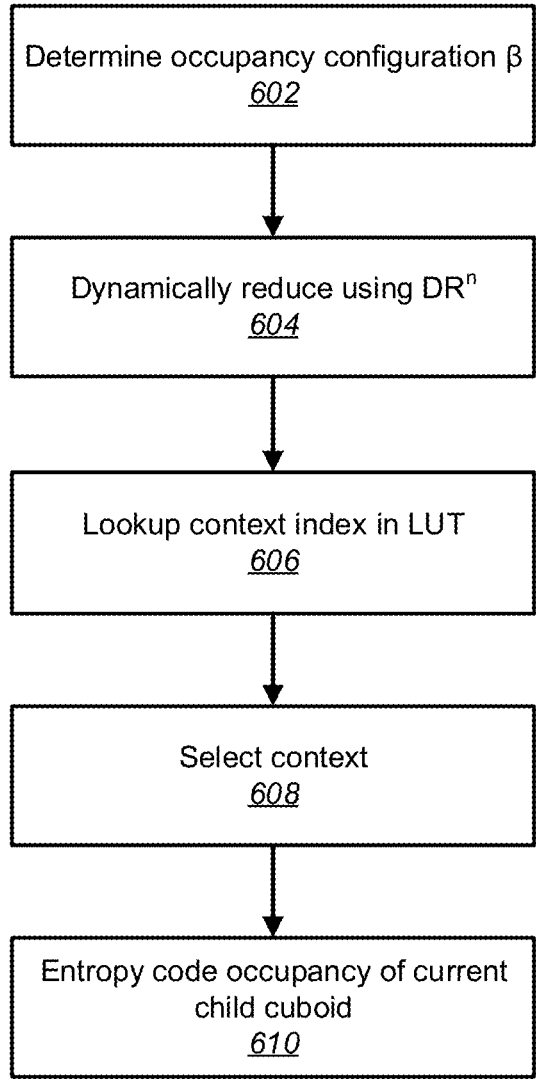
FIG. 6 shows an example method for coding occupancy of a cuboid using dynamic OBUF.

FIG. 6 shows an example method for coding occupancy of a cuboid using dynamic OBUF. More specifically, FIG. 6 shows an example method for coding occupancy bit of a current child cuboid using dynamic OBUF. One or more steps of FIG. 6 may be performed by an encoder and/or a decoder (e.g., the encoder 114 and/or decoder 120 in FIG. 1). All or portions of the flowchart may be implemented by a coder (e.g., the encoder 114 and/or decoder 120 in FIG. 1), an example computer system 1800 in FIG. 18, and/or an example computing device 1930 in FIG. 19.

At step 602, an occupancy configuration (e.g., occupancy configuration $\beta$) of the current child cuboid may be determined. The occupancy configuration (e.g., occupancy configuration $\beta$) of the current child cuboid may be determined, for example, based on occupancy bits of already-coded cuboids in a neighborhood of the current child cuboid. At step 604, the occupancy configuration (e.g., occupancy configuration $\beta$) may be dynamically reduced. The occupancy configuration may be dynamically reduced, for example, using a dynamic reduction function $DR^n$. For example, the occupancy configuration $\beta$ may be dynamically reduced into a reduced occupancy configuration $\beta'=DR''(\beta)$. At step 606, context index may be looked up, for example, in a look-up table (LUT). For example, the encoder and/or decoder may look up context index $LUT[\beta']$ in the LUT of the dynamic OBUF. At step 608, context (e.g., probability model) may be selected. For example, the context (e.g., probability model) pointed to by the context index may be selected. At step 610, occupancy of the current child cuboid may be entropy coded. For example, the occupancy bit of the current child cuboid may be entropy coded (e.g., arithmetic coded), for example, based on the context. The occupancy bit of the current child cuboid may be coded based on the occupancy bits of the already-coded cuboids neighboring the current child cuboid.

Although not shown in FIG. 6, the encoder and/or decoder may update the reduction function and/or update the context index. For example, the encoder and/or decoder may update the reduction function $DR''$ into $DR''^{+1}$ and/or update the context index $LUT[\beta']$, for example, based on the occupancy bit of the current child cuboid. The method of FIG. 6 may be repeated for additional or all child cuboids of parent cuboids corresponding to nodes of the occupancy tree in a scan order, such as the scan order discussed herein with respect to FIG. 3.

In general, the occupancy tree is a lossless compression technique. The occupancy tree may be adapted to provide lossy compression, for example, by modifying the point cloud on the encoder side (e.g., down-sampling, removing points, moving points, etc.). The performance of the lossy compression may be weak. The lossy compression may be a useful lossless compression technique for dense point clouds.

One approach to lossy compression for point cloud geometry may be to set the maximum depth of the occupancy tree to not reach the smallest volume size of one voxel but instead to stop at a bigger volume size (e.g., N×N×N cuboids (e.g., cubes), where N>1). The geometry of the points belonging to each occupied leaf node associated with the bigger volumes may then be modeled. This approach may be particularly suited for dense and smooth point clouds that may be locally modeled by smooth functions such as planes or polynomials. The coding cost may become the cost of the occupancy tree plus the cost of the local model in each of the occupied leaf nodes.

A scheme for modeling the geometry of the points belonging to each occupied leaf node associated with a volume size larger than one voxel may use sets of triangles as local models. The scheme may be referred to as the "TriSoup" scheme. TriSoup is short for "Triangle Soup" because the connectivity between triangles may not be part of the models. An occupied leaf node of an occupancy tree that corresponds to a cuboid with a volume greater than one voxel may be referred to as a TriSoup node. An edge belonging to at least one cuboid corresponding to a TriSoup node may be referred to as a TriSoup edge. A TriSoup node may comprise a presence flag $(s_k)$ for each TriSoup edge of its corresponding occupied cuboid. A presence flag $(s_k)$ of a TriSoup edge may indicate whether a TriSoup vertex $(V_k)$ is present or not on the TriSoup edge. At most one TriSoup vertex $(V_k)$ may be present on a TriSoup edge. For each vertex $(V_k)$ present on a TriSoup edge of an occupied cuboid, the TriSoup node corresponding to the occupied cuboid may comprise a position $(p_k)$ of the vertex $(V_k)$ along the TriSoup edge.

In addition to the occupancy words of an occupancy tree, an encoder may entropy encode, for each TriSoup node of the occupancy tree, the TriSoup vertex presence flags and positions of each TriSoup edge belonging to TriSoup nodes of the occupancy tree. A decoder may similarly entropy decode the TriSoup vertex presence flags and positions of each TriSoup edge and vertex along a respective TriSoup edge belonging to a TriSoup node of the occupancy tree, in addition to the occupancy words of the occupancy tree.

Figure 7:
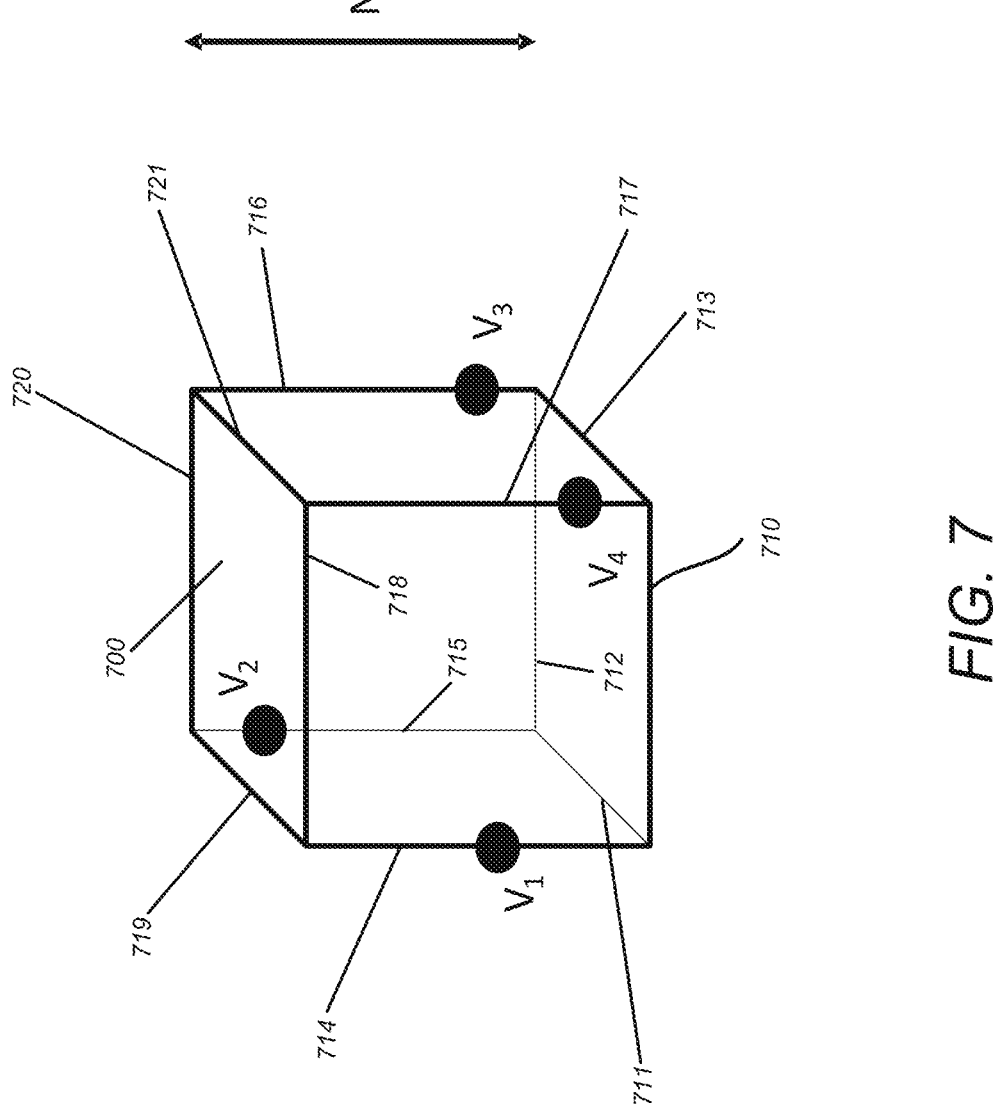
FIG. 7 shows an example of an occupied cuboid.

FIG. 7 shows an example of an occupied cuboid (e.g., cube) 700. More specifically, FIG. 7 shows an example of an occupied cuboid (e.g., cube) 700 of size N×N×N (where N>1) that corresponds to a TriSoup node of an occupancy tree. An occupied cuboid 700 may comprise edges (e.g., TriSoup edges 710-721). The TriSoup node, corresponding to the occupied cuboid 700, may comprise a presence flag $(s_k)$ for each edge (e.g., each TriSoup edge of the TriSoup edges 710-721). For example, the presence flag of a TriSoup edge 714 may indicate that a TriSoup vertex $V_1$ is present on the TriSoup edge 714. The presence flag of a TriSoup edge 715 may indicate that a TriSoup vertex $V_2$ is present on the TriSoup edge 715. The presence flag of a TriSoup edge 716 may indicate that a TriSoup vertex $V_3$ is present on the TriSoup edge 716. The presence flag of a TriSoup edge 717 may indicate that a TriSoup vertex $V_4$ is present on the TriSoup edge 717. The presence flags of the remaining TriSoup edges each may indicate that a TriSoup vertex is not present on their corresponding TriSoup edge. The TriSoup node, corresponding to the occupied cuboid 700, may comprise a position for each TriSoup vertex present along one of its TriSoup edges 710-721. More specifically, the TriSoup node, corresponding to the occupied cuboid 700, may comprise a position $p_1$ for TriSoup vertex $V_1$, a position $p_2$ for TriSoup vertex $V_2$, a position $p_3$ for TriSoup vertex $V_3$, and a position $p_4$ for TriSoup vertex $V_4$. The TriSoup vertices may be shared among TriSoup nodes along common TriSoup edge(s).

A presence flag $(s_k)$ and, if the presence flag $(s_k)$ may indicate the presence of a vertex, a position $(p_k)$ of a current TriSoup edge may be entropy coded. The presence flag $(s_k)$ and position $(p_k)$ may be individually or collectively referred to as vertex information or TriSoup vertex information. A presence flag $(s_k)$ and, if the presence flag $(s_k)$ indicates the presence of a vertex, a position $(p_k)$ of a current TriSoup edge may be entropy coded, for example, based on already-coded presence flags and positions, of present TriSoup vertices, of TriSoup edges that neighbor the current TriSoup edge. A presence flag $(s_k)$ and, if the presence flag $(s_k)$ may indicate the presence of a vertex, a position $(p_k)$ of a current TriSoup edge (e.g., indicating a position of the vertex the edge is along) may be additionally or alternatively entropy coded. The presence flag $(s_k)$ and the position $(p_k)$ of a current TriSoup edge may be additionally or alternatively entropy coded, for example, based on occupancies of cuboids that neighbor the current TriSoup edge. Similar to the entropy coding of the occupancy bits of the occupancy tree, a configuration $\beta_{TS}$ for a neighborhood (also referred to as a neighborhood configuration $\beta_{TS}$) of a current TriSoup edge may be obtained and dynamically reduced into a reduced configuration $\beta_{TS'}=DR''(\beta_{TS})$, for example, by using a dynamic OBUF scheme for TriSoup. A context index $LUT[\beta_{TS'}]$ may be obtained from the OBUF LUT. At least a part of the vertex information of the current TriSoup edge may be entropy coded using the context (e.g., probability model) pointed to by the context index.

The TriSoup vertex position $(p_k)$ (if present) along its TriSoup edge may be binarized. The TriSoup vertex position $(p_k)$ (if present) along its TriSoup edge may be binarized, for example, to use a binary entropy coder to entropy code at least part of the vertex information of the current TriSoup edge. A number (e.g., quantity) of bits $N_b$ may be set for the quantization of the TriSoup vertex position $(p_k)$ along the TriSoup edge of length N. The TriSoup edge of length N may be uniformly divided into $2^{Nb}$ quantization intervals. By doing so, the TriSoup vertex position $(p_k)$ may be represented by No bits $(p_k^j, j=1, \ldots, N_b)$ that may be individually coded by the dynamic OBUF scheme as well as the bit corresponding to the presence flag $(s_k)$. The neighborhood configuration $\beta_{TS}$, the OBUF reduction function $DR''$, and the context index may depend on the nature, characteristic, and/or property of the coded bit (e.g., a presence flag $(s_k)$, a highest position bit $(p_{k1})$, a second highest position bit $(p_{k2})$, etc.) of the coded bit (e.g., presence flag $(s_k)$, highest position bit $(p_k^1)$, second highest position bit $(p_k^2)$, etc.). There may practically be several dynamic OBUF schemes, each dedicated to a specific bit of information (e.g., presence flag $(s_k)$ or position bit $(p_k^j)$) of the vertex information.

Figure 8B:
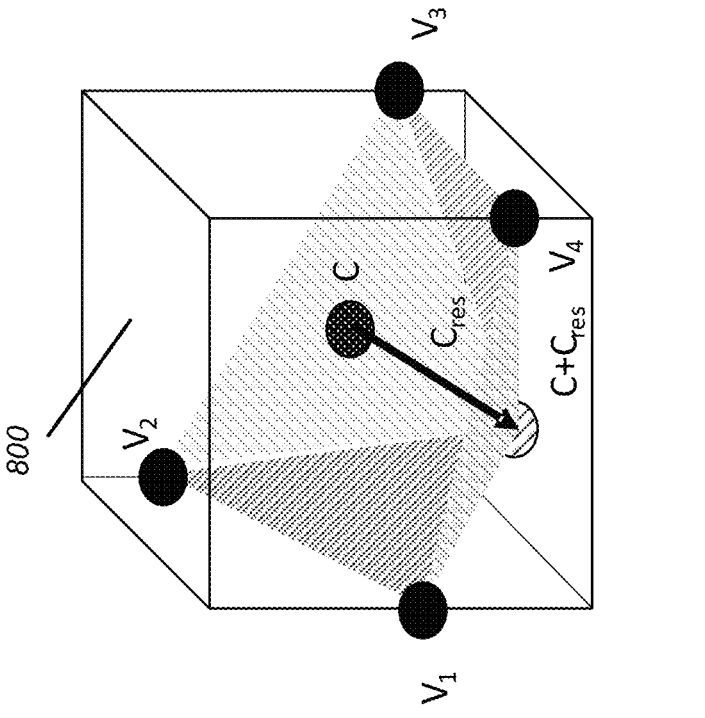
FIG. 8B shows an example refinement to the TriSoup model.
Figure 8A:
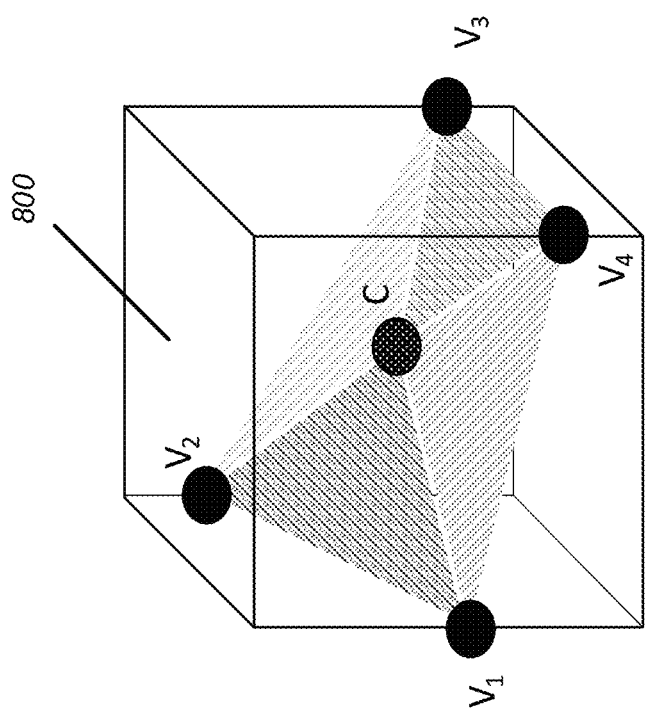
FIG. 8A shows an example cuboid corresponding to a TriSoup node.

FIG. 8(a) shows an example cuboid (e.g., cube) 800 corresponding to a TriSoup node. A cuboid 800 may correspond to a TriSoup node with a number K of TriSoup vertices $V_k$. Within cuboid 800, TriSoup triangles may be constructed from the TriSoup vertices $V_k$. TriSoup triangles may be constructed from the TriSoup vertices $V_k$, for example, if at least three (K≥3) TriSoup vertices are present on the TriSoup edges of cuboid 800. For example, with respect to FIG. 8(a), four TriSoup vertices may be present and TriSoup triangles may be constructed. The TriSoup triangles may be constructed around the centroid vertex C defined as the mean of the TriSoup vertices $V_k$. A dominant direction may be determined, then vertices $V_k$ may be ordered by turning around this direction, and the following K TriSoup triangles may be constructed: $V_1V_2C$, $V_2V_3C, \ldots, V_KV_1C$. The dominant direction may be chosen among the three directions respectively parallel to the axes of the 3D space to increase or maximize the 2D surface of the triangles, for example, if the triangles are projected along the dominant direction. By doing so, the dominant direction may be somewhat perpendicular to a local surface defined by the points of the point cloud belonging to the TriSoup node.

FIG. 8B shows an example refinement to the TriSoup model. The TriSoup model may be refined by coding a centroid residual value $C_{res}$. A centroid residual value $C_{res}$ may be coded into the bitstream. A centroid residual value $C_{res}$ may be coded into the bitstream, for example, to use $C+C_{res}$ instead of C as a pivoting vertex for the triangles. By using $C+C_{res}$ as the pivoting vertex for the triangles, the vertex $C+C_{res}$ may be closer to the points of the point cloud than the centroid C, the reconstruction error may be lowered, leading to lower distortion at the cost of a small increase in bitrate needed for coding $C_{res}$.

Figure 9:
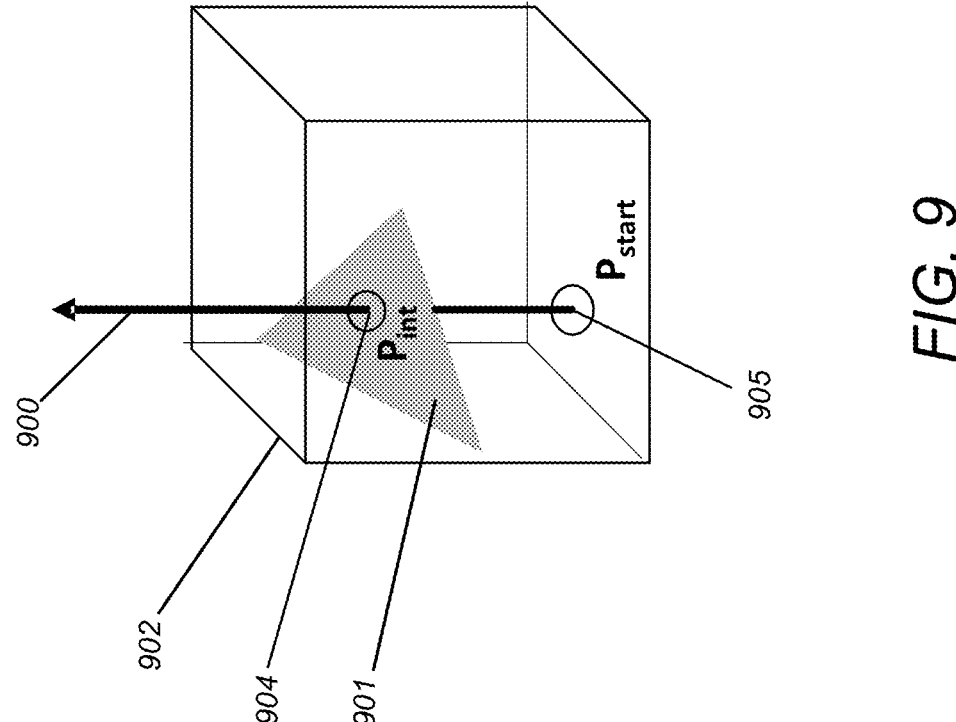
FIG. 9 shows an example of voxelization.

FIG. 9 shows an example of voxelization. Voxelization may refer to reconstruction of a decoded point cloud from a set of TriSoup triangles. Voxelization may be performed by ray tracing for each triangle individually. Voxelization may be performed by ray tracing for each triangle individually, for example, before removing duplicated points between voxelized triangles. As shown in FIG. 9, rays 900 may be launched parallel to one of the three axes of the 3D space. Rays 900 may be launched starting from integer coordinates $P_{start}$ 905 (e.g., an origin point). The intersection Pint 904, if any, of the rays 900 with a TriSoup triangle 901 belonging to a cuboid (e.g., cube) 902 corresponding to a TriSoup node may be rounded to obtain a decoded point. This intersection Pint may be found, for example, using the Möller-Trumbore algorithm.

TriSoup vertices of TriSoup nodes may need to be quantized to certain, acceptable vertex positions to ensure continuity of a triangle-based modeling between TriSoup nodes. As a result, Tri-Soup modeling that approximates occupied voxels within a TriSoup node may not match occupied voxels determined to be within a TriSoup triangle with quantized TriSoup vertices. Some voxels may be missed, for example, if voxelizing of the TriSoup triangle occurs. Techniques including the "halo" method and "fine-ray-launch" method, as described herein, have been introduced to enhance the voxelization process in an effort to improve voxel reconnection between triangles.

Both the halo and fine-ray-launch methods attempt to increase possible intersections between launched rays and triangles to "recapture" missed voxels resulting from quantizing vertices of TriSoup triangles. While the halo method does not significantly increase complexity and processing costs, the fine-ray-launch method may significantly increase processing costs because a plurality of rays at non-integer coordinates (referred to as fine rays) are launched additionally for each ray at integer coordinates to increase possible intersections between rays and TriSoup triangles. Not only does processing costs significantly increase to implement fine-ray-launch methods, but the fine-ray-launch method also overlaps with the halo method and may recapture some of the same missed voxels, which may reduce its effectiveness. Examples of the present disclosure include enhancing a voxelization process by adding one or more additional points close to each determined point (e.g., intersection point) of a TriSoup triangle and quantizing, or voxelizing, the one or more additional points along with the determined point of the TriSoup triangle. The one or more additional points may be extended from the determined point, for example, in a direction not aligned with a plane of the TriSoup triangle. This quantization process is less computationally intensive than fine-ray-launch methods, and quantization of these one or more additional points may recapture voxels that may not be identified by halo methods and, as a result, may be implemented with halo methods to enhance voxelization.

Figure 10:
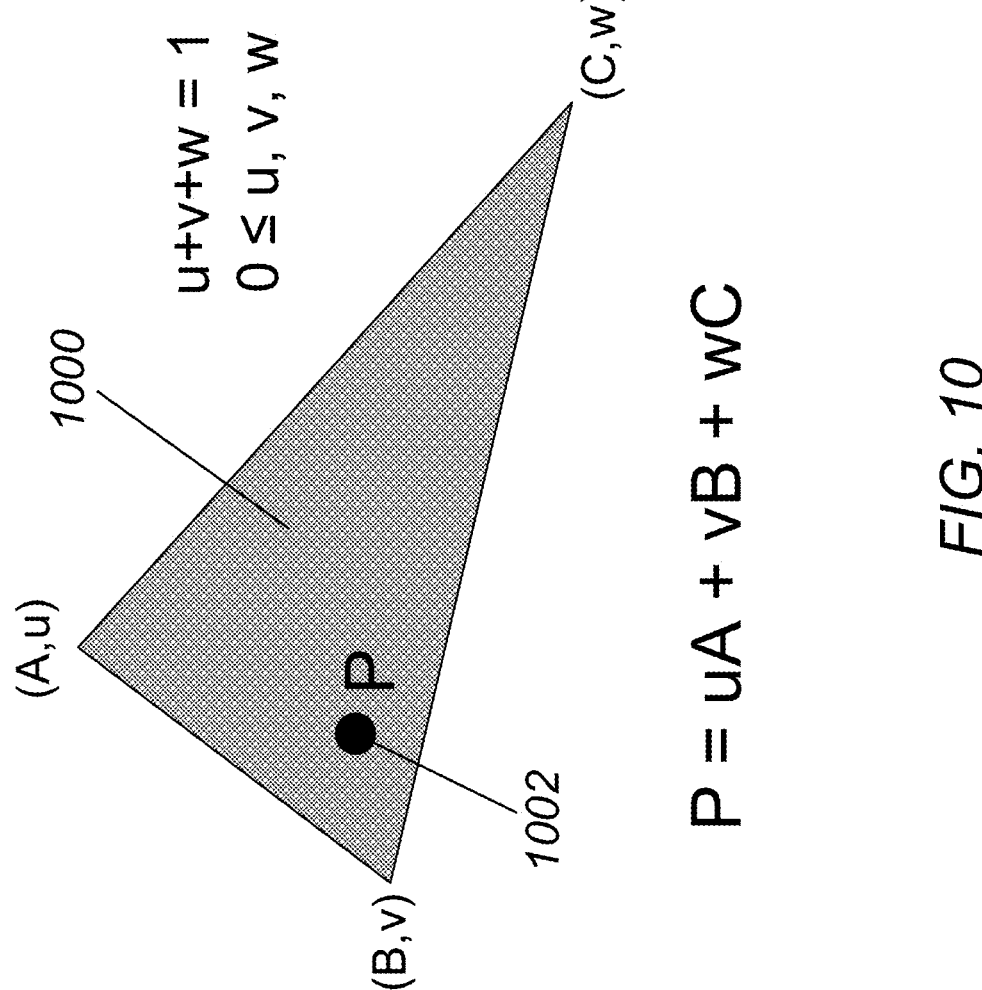
FIG. 10 shows an example of barycentric coordinates of a point relative to a TriSoup triangle.

FIG. 10 shows an example of barycentric coordinates of a point relative to a TriSoup triangle. More specifically, FIG. 10 shows an example of barycentric coordinates (u, v, w) of a point 1002 (e.g., P) relative to a TriSoup triangle 1000 having vertices labeled A, B, and C in a 3D space. For example, the point 1002 may be determined as an intersection between a ray and a plane of TriSoup triangle 1000 (e.g., containing or passing through the three vertices A, B, and C of the TriSoup triangle 1000). For example, the ray may be launched parallel to one of the three coordinate axes in 3D space. This intersection point 1002 may be uniquely represented as a sum of the three vertices of TriSoup triangle 1000:

$$P = uA + vB + wC$$

under the condition u+v+w=1. Any point P of the plane (containing TriSoup triangle 1000) may have unique coordinates (u,v,w) in the barycentric coordinate system. A point with barycentric coordinates (u,v,w) may include an ordered triple of quantities/numbers u, v, and w. A point with barycentric coordinates (u,v,w) that sum to 1 (i.e., u+v+w=1) may be known as homogeneous barycentric coordinates or normalized barycentric coordinates. The barycentric coordinates of the intersection point with respect to TriSoup triangle 1000 may be determined using, e.g., the well-known Möller-Trumbore algorithm.

The three vertices A, B, C of TriSoup triangle 1000 may have respective barycentric coordinates A (1,0,0), B (0,1,0) and C (0,0,1) by converting points with Cartesian coordinates in 3D space to homogeneous barycentric coordinates. The convex hull (i.e., TriSoup triangle 1000) of the three vertices A, B, and C is equal to the set of all points such that the barycentric coordinates u, v, and w is each greater than or equal to zero:

$$0 \le u, v, w$$

The intersection point may be determined to belong to the TriSoup triangle 1000, for example, based on the intersection point having barycentric coordinates with an ordered triple of values that is each greater than or equal to zero. If at least one of the barycentric coordinates (e.g., one of u, v, or w) is negative or less than 0, the intersection point may be determined not to belong to the TriSoup triangle because it may be on the plane, but not on an edge or within the TriSoup triangle. A point determined to belong to the TriSoup triangle 1000 may be the ray intersecting the TriSoup triangle 1000 (e.g., within or at an edge of the TriSoup triangle 1000).

In the Möller-Trumbore algorithm, an intersection point of a ray with the plane that a TriSoup triangle belongs to may be determined, for example, based on computing, for the intersection point, the barycentric coordinates values of u, v, and w. The intersection point may be determined to be in the TriSoup triangle (e.g., on an edge of or within the TriSoup triangle), for example, based on verifying that each of the barycentric coordinates u, v, and w is greater or equal to 0 (e.g., $0 \le u$, v, w). The intersection point may be determined, for example, to be outside of the TriSoup triangle.

Figure 11:
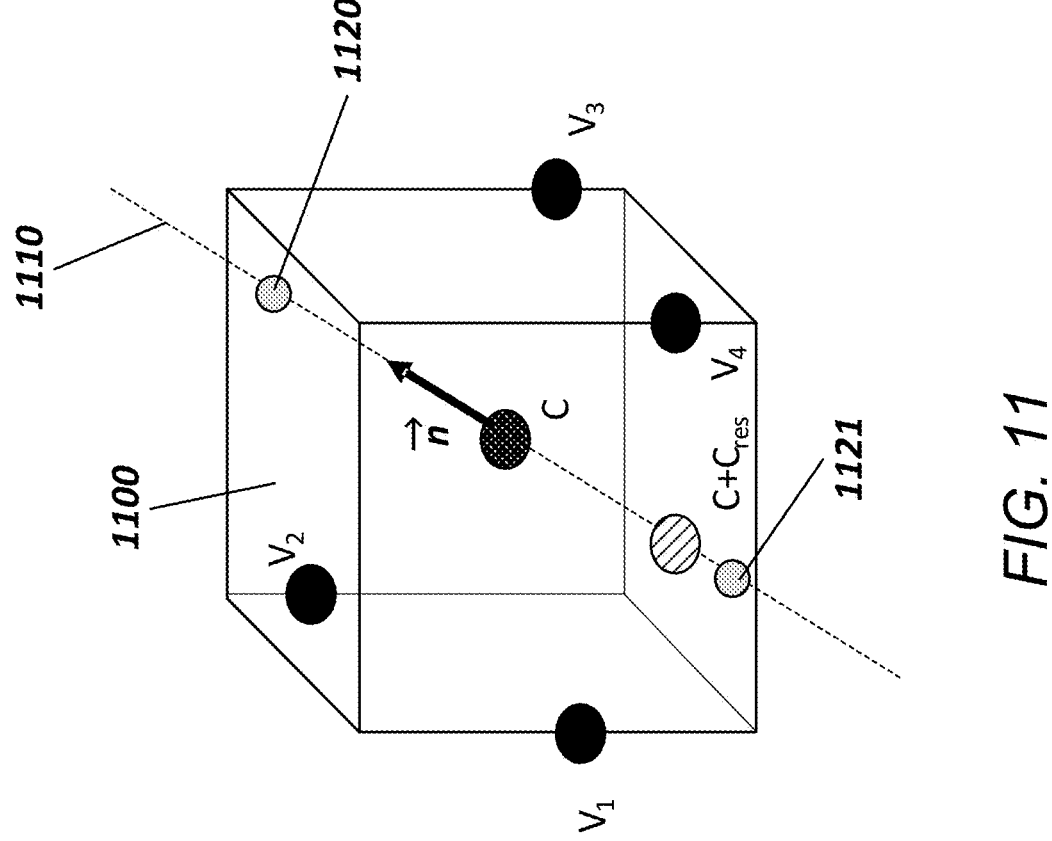
FIG. 11 shows an example of coding a centroid residual value.

FIG. 11 shows an example of coding a centroid residual value. More specifically, FIG. 11 shows a more detailed example of coding a centroid residual value $C_{res}$ in/from the bitstream such that an adjusted centroid $C+C_{res}$ is used instead of centroid C for generating TriSoup triangles of a cuboid 1100 (corresponding to a TriSoup node) corresponding to a portion of a point cloud. The TriSoup triangles may be generated, for example, based on the adjusted centroid $C+C_{res}$ and adjacent pairs of vertices of an ordering of the vertices $V_1$-$V_4$, determined as described herein with respect to FIG. 8(a). As described herein, the TriSoup triangles of the cuboid 1100 may be voxelized at the decoder, for example, to generate voxels representing (or modeling) the portion, of the point cloud, corresponding to the cuboid 1100. A unit vector n (e.g., also referred to as a normalized vector) may be determined as a normalized mean vector of normal vectors to the triangles $(V_1V_2C, V_2V_3C, \ldots, V_KV_1C)$ constructed by the centroid C and pairs of the vertices of the cuboid 1100 by pivoting around the centroid C (e.g., as described herein with respect to FIG. 8(a)). The unit vector $\vec{n}$ may be determined as the normalized vector, for example, based on a mean of cross-products representing areas of the triangles $(\overrightarrow{V_1C} \times \overrightarrow{V_2C} + \overrightarrow{V_2C} \times \overrightarrow{V_3C} + \ldots + \overrightarrow{V_KC} \times \overrightarrow{V_1C})/K$. For example, the unit vector $\vec{n}$ may be determined by dividing the mean vector (n) by the norm (or length) of the mean vector (e.g., $\vec{n} = n/\|n\|$).

A value resulting from each cross product is equal to an area of a parallelogram formed by the two vectors in the cross product. The value may be representative of an area of a triangle formed by the two vectors, for example, because the area of the triangle is equal to half of the value. The vector $\vec{n}$ may be indicative of the direction normal to a local surface representative of the portion of the point cloud, for example, because the vector $\vec{n}$ may indicate a direction of the triangles (e.g., TriSoup triangles) representing (e.g., modeling) the portion of the point cloud. A one-component residual $\alpha_{res}$ along the line (C, $\vec{n}$) 1110 may be coded instead of a 3D residual, for example, to maximize the effect of the centroid residual and/or minimize its coding cost.

$$C_{res} = \alpha_{res}\vec{n}$$

The residual value $\alpha_{res}$ may be determined, for example, by the encoder as the intersection between the current point cloud and the line (C, $\vec{n}$), which may be along the same direction of the normalized vector $\vec{n}$. For example, a set of points, of the portion of the point cloud, closest (e.g., within a threshold distance, a threshold quantity/number of points) to the line may be determined by the encoder. The set of points may be projected on the line and the residual value $\alpha_{res}$ may be determined by the encoder as the mean component along the line of the projected points. The mean may be determined, for example, as a weighted mean whose weights may depend on the distance of the set of points from the line. For example, a point from the set closer to the line may have a higher weight than another point from the set farther from the line.

The residual value $\alpha_{res}$ may be quantized. For example, the residual value $\alpha_{res}$ may be quantized by a uniform quantization function having quantization step similar to the quantization precision of the TriSoup vertices $V_k$. By quantizing the residual value $\alpha_{res}$ by a uniform quantization function having quantization step similar to the quantization precision of the TriSoup vertices $V_k$, the quantization error may be maintained to be uniform over all vertices $V_k$ and $C+C_{res}$ such that the local surface may be uniformly approximated.

The residual value $\alpha_{res}$ may be binarized and/or entropy coded into the bitstream, for example, by using a unary-based coding scheme. The residual value $\alpha_{res}$ may be coded, for example, using a set of flags. For example, a flag $f_0$ may be coded to indicate if the residual value $\alpha_{res}$ is equal to zero. If the flag $f_0$ indicates the residual value $\alpha_{res}$ is zero, no further syntax elements may be needed. If the flag $f_0$ indicates the residual value $\alpha_{res}$ is not zero, a sign bit indicating a sign may be coded and/or the residual magnitude $|\alpha_{res}|$-1 may be coded using an entropy code. For example, the residual magnitude may be coded using a unary coding scheme that may code successive flags $f_i$ ($i \ge 1$) indicating if the residual value magnitude $|\alpha_{res}|$ is equal to 'i'. A coder (e.g., a binary entropy coder) may binarize the residual value $\alpha_{res}$ into the flags $f_i$ ($i \ge 0$) and code (e.g., entropy code) the binarized residual value as well as the sign bit.

Compression of the residual value $\alpha_{res}$ may be improved, for example, by determining bounds as shown in FIG. 11. As described herein with respect to FIG. 11, the line (C, $\vec{n}$) 1110 may intersect the current cuboid 1100 (corresponding to a TriSoup node) at two bounding points, 1120 and 1121, and the encoder may impose that the adjusted centroid vertex $C+C_{res}$ may be located between the two bounding points 1120 and 1121. These bounding points, 1120 and 1121, may bound the residual value $\alpha_{res}$ (which may be quantized), ensuring it belongs to an integral interval [m, M], where $m \leq 0 \leq M$. By doing so, some bits of the binarized residual value $\alpha_{res}$ may be inferred. For example, if m=M=0, residual value $\alpha_{res}$ is necessarily equal to zero. For example, if m=0<M, the sign bit is necessarily positive. If the residual value $\alpha_{res}$ is not equal to zero and its sign is known, its magnitude $|\alpha_{res}|$ may be determined to be bounded by either |m| or M such that the magnitude may be coded by a truncated unary coding scheme that may infer the value of the last of successive flags $f_i$ ($i \geq 1$).

The binary entropy coder that may be used to code the binarized residual value $\alpha_{res}$ may be a context-adaptive binary arithmetic coder (CABAC) such that the probability model (also referred to as a context or a specific entropy coder) that may be used to code at least one bit (e.g., $f_i$ or sign bit) of the binarized residual value $\alpha_{res}$ may be updated depending on precedingly coded bits. The probability model of the binary entropy coder may be determined, for example, based on contextual information such as the values of the bounds m and M, the position of vertices $V_k$, and/or the size of the cuboid. The selection of the probability model (i.e., also referred equivalently as an entropy coder or context) may be performed by a dynamic OBUF scheme with the contextual information described herein as inputs.

The centroid vertex C of the cuboid may be determined as the simple mean of the TriSoup vertices $V_k$ located on edges of the cuboid, for example, to voxelize TriSoup triangles of a cuboid corresponding to a portion of a point cloud. For example, determining the centroid vertex C as the simple mean (e.g., average) may lead to inaccuracies in the TriSoup model, which may be composed of triangles, depending on the quantity/number and/or positions of the TriSoup vertices of the cuboid, as described herein with respect to FIG. 12A and FIG. 12B.

Figure 12B:
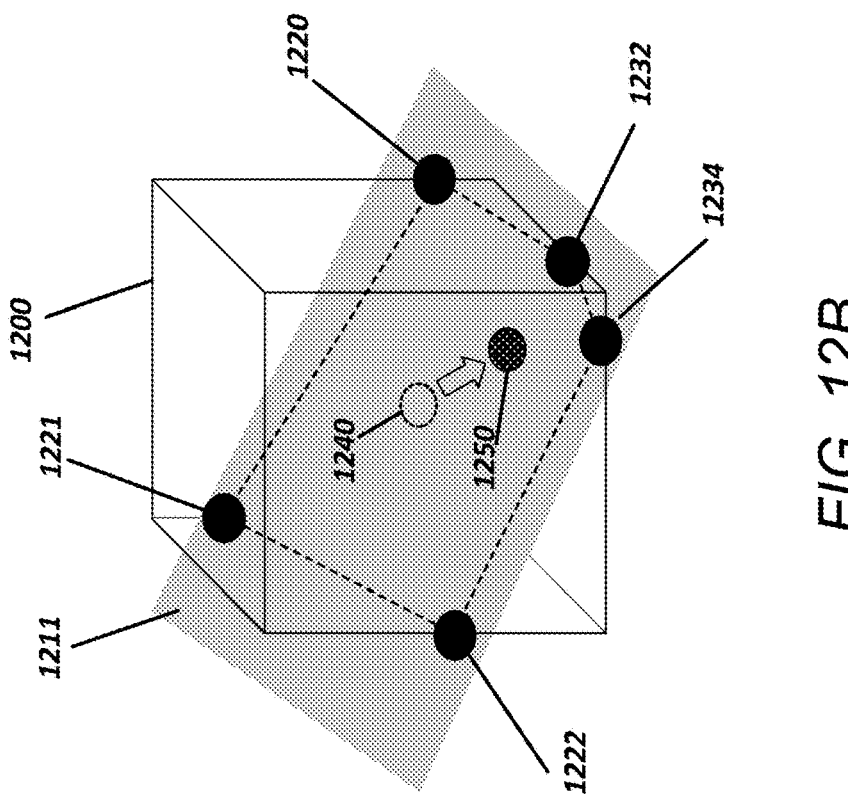
FIG. 12B shows an example of a centroid vertex determined from TriSoup vertices of a cuboid.
Figure 12A:
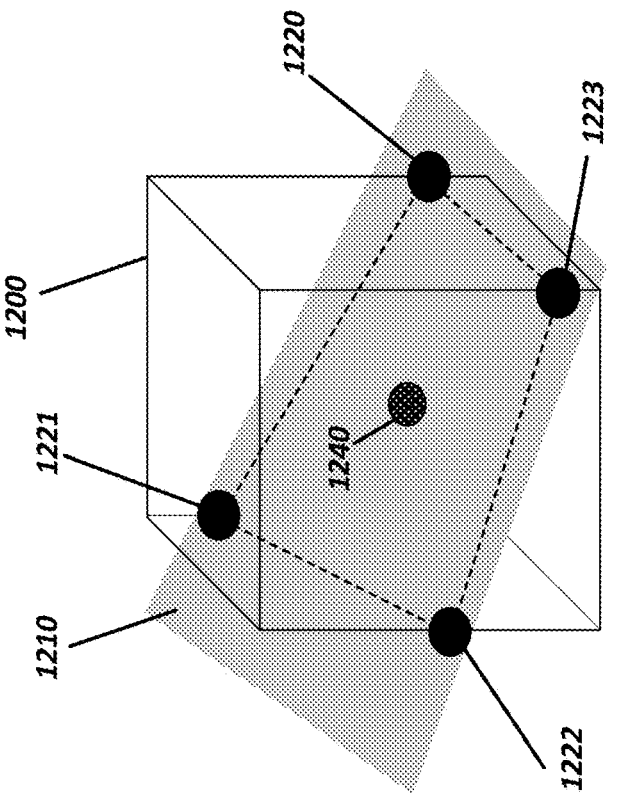
FIG. 12A shows an example of a centroid vertex determined from TriSoup vertices of a cuboid.

FIG. 12A shows an example of a centroid vertex determined from TriSoup vertices of a cuboid. More specifically, FIG. 12A shows an example of a centroid vertex 1240 determined from TriSoup vertices 1220, 1221, 1222, and 1223 of a cuboid 1200, indicated by a TriSoup node, corresponding to a portion of a point cloud. For example, the local spatial distribution of points of the portion of the point cloud corresponding to the cuboid 1200 may be represented (or modeled) by a local surface 1210 (e.g., a plane 1210) that may intersect the cuboid 1200, for example, at four points located on four respective edges of the cuboid 1200 associated with the TriSoup node. These four points may be quantized to respective TriSoup vertices 1220, 1221, 1222, and 1223. For example, other methods may be used to model the local distribution of the points as a set of TriSoup vertices on edges (e.g., three or more edges, or four or more edges, etc.) of the cuboid 1200. For example, instead of modeling the points as a local surface (e.g., the plane 1210 as shown in FIG. 12A), locations of points of the portion of the point cloud near (e.g., within a distance of or within a threshold of) each edge may be averaged to determine whether to encode a TriSoup vertex on the edge, and if so, a position of the TriSoup vertex on the edge.

A centroid vertex 1240 of the cuboid 1200 may be determined as the simple average of TriSoup vertices 1220, 1221, 1222, and 1223. For example, each coordinate of the centroid vertex 1240 may be determined as an average of the corresponding coordinates of TriSoup vertices 1220, 1221, 1222, and 1223. A small change in the local spatial distribution of the points of the point cloud may lead to a small change of the local surface modeled by the local surface 1210, but lead to a change of the quantity/number, and/or positions of TriSoup vertices 1220, 1221, 1222, and 1223 that are the intersection between the local surface 1210 and the edges of the cuboid 1200, which is associated with the TriSoup node.

FIG. 12B shows an example of a centroid vertex determined from TriSoup vertices of a cuboid. For example, as described herein with respect to FIG. 12B, a centroid vertex 1250 may be determined as a result of a small change in the local spatial distribution, of the points of the point cloud, resulting in the local surface (e.g., illustratively representative of the local spatial distribution) changing from the local surface 1210 (as shown in FIG. 12A) to a local surface 1211 (as shown in FIG. 12B).

As described herein, TriSoup vertices 1220, 1221, 1222, and 1223 may be determined directly from the points of the portion of the point clouds. As described with respect to FIG. 12A and FIG. 12B, the small change in the distribution of these points may lead to a change of the four TriSoup vertices 1220, 1221, 1222, and 1223 into five TriSoup vertices 1220, 1221, 1222, 1232, and 1234. A small change in the point distribution may lead to a discontinuity in the quantity/number of TriSoup vertices. The centroid vertex may be determined as the simple average of the TriSoup vertices. The centroid vertex may not change continuously (e.g., from the centroid vertex 1240 in FIG. 12A to the centroid vertex 1250 in FIG. 12B). The discontinuity of the determination of a centroid vertex from the points of the point clouds may lead to inefficient prediction between two point clouds, for example, if inter prediction is used between two frames of a dynamic point cloud. This discontinuity may lead to suboptimal compression performance.

Figure 13:
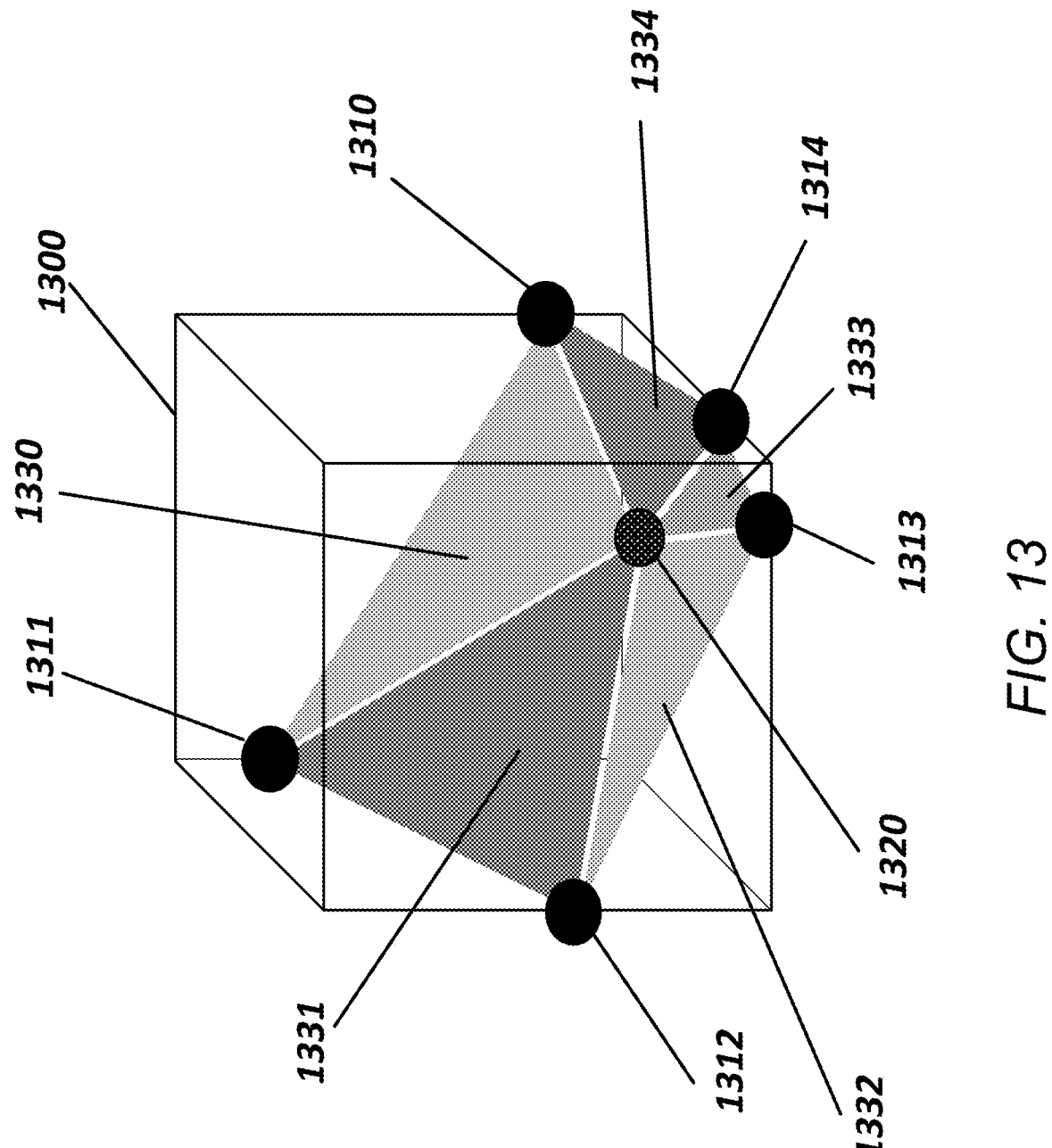
FIG. 13 shows an example of TriSoup triangles in a cuboid.

FIG. 13 shows an example of TriSoup triangles in a cuboid. More specifically, FIG. 13 shows an example of TriSoup triangles 1330, 1331, 1332, 1333, and 1334, in a cuboid 1300 corresponding to a TriSoup node, formed from TriSoup vertices 1310, 1311, 1312, 1313, and 1314 and a centroid vertex 1320. The location of the centroid vertex 1320 may not be located "at the middle" of the part of the local surface representing a portion of a point cloud encompassed by the cuboid 1300. Two TriSoup vertices 1313 and 1314 of five TriSoup vertices 1310, 1311, 1312, 1313, and 1314 may be located on the edges of the cuboid 1300. The two TriSoup vertices 1313 and 1314 may be closer to each other than the other vertices. A consequence of the simple average of TriSoup vertices 1310, 1311, 1312, 1313, and 1314 is the centroid vertex 1320, which is located closer to the two vertices 1313 and 1314 than to the other three vertices 1310, 1311, and 1312. TriSoup triangles 1330, 1331, 1332, 1333, and 1334, which may be constructed from pairs of adjacent vertices and the centroid vertex 1320, may have significantly different sizes. For example, as described with respect to FIG. 13, TriSoup triangle 1333 is much smaller than TriSoup triangle 1331.

Differences in the sizes of TriSoup triangles may lead to suboptimal local interpolation of the point cloud by the triangles of the TriSoup model and/or induce greater distortion and/or suboptimal compression performance. The centroid vertex may need to be determined continuously, for example, based on the local distribution of the points within the point cloud. Additionally, the position of the centroid vertex may need to be adjusted to be more equidistant from the TriSoup vertices of the cuboid.

As described herein, a centroid vertex of a cuboid may be determined based on a weighted sum of the TriSoup vertices of the cuboid. The TriSoup vertices of the cuboid may correspond to a portion of a point cloud. Each vertex of the TriSoup vertices may have a weight. The weight of each vertex may be determined, for example, based on neighboring vertices of each vertex. Triangles (e.g., TriSoup triangles) may be determined, for example, based on the centroid vertex and pairs of the vertices. The triangles may be voxelized to determine voxels that represent the portion of the point cloud (e.g., as described herein with respect to FIG. 9 and/or FIG. 10).

For each vertex, the areas of triangles formed by a centroid vertex, a vertex, and each of the neighboring vertices of the vertex may be determined. The weight for a respective vertex of the vertices may be determined, for example, based on the areas of the triangles. Additionally or alternatively, the weight of each vertex may be determined based on the distances between the vertex and each of the neighboring vertices of the vertex. For example, the distances may be based on an L1 norm (e.g., also known as a Manhattan norm) or an L2 norm (e.g., also known as a Euclidean norm). The weight, for example, may be determined to be proportional to a sum of the areas of the triangles, such as the same as or one half of the sum of the areas of the triangles. Additionally or alternatively, the weight may be determined to be proportional to a sum of the distances between the vertex and each of the neighboring vertices of the vertex, such as the same as or one half of the sum of the distances between the vertex and each of the neighboring vertices of the vertex.

Figure 14B:
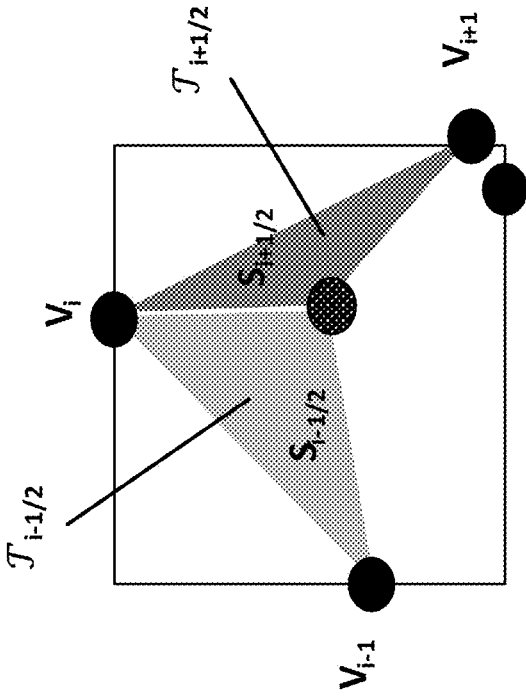
FIG. 14B shows an example of determining the weights of TriSoup vertices.
Figure 14A:
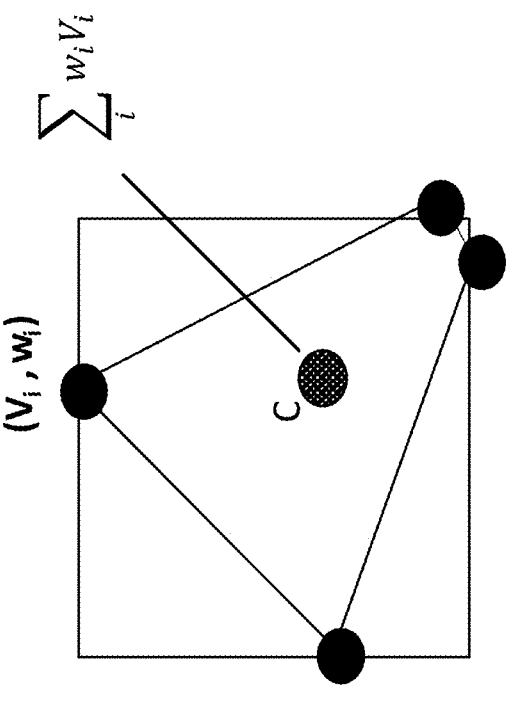
FIG. 14A shows an example of determining a centroid vertex.

FIG. 14A shows an example of determining a centroid vertex of a cuboid. More specifically, FIG. 14A shows an example of determining a centroid vertex of a cuboid, for example, as a weighted sum of TriSoup vertices of the cuboid corresponding to a TriSoup node. As described herein with respect to FIG. 12A, FIG. 12B, and FIG. 13, the cuboid may correspond to (e.g., encompass) a portion of a point cloud. As shown in 2 dimensions in FIG. 14A, a centroid vertex C may be determined, for example, based on a weighted sum (or a weighted average):

$$C = \sum_i w_i V_i$$

over the TriSoup vertices $V_i$ that may belong to the cuboid, for which the centroid vertex is to be determined. The centroid vertex C may be determined as a weighted average (or weighted mean), in which case the sum of the weights $w_i$ is equal to one. This approach may ensure that the centroid vertex C belongs to (e.g., is contained in) the cuboid associated with the TriSoup node.

$$\sum_i w_i = 1$$

The weights $w_i$ sum to one. Each of the weights $w_i$ may be between 0 and 1, for example, if the centroid vertex C is determined as the weighted average.

The centroid vertex C may be determined as the weighted sum divided by a sum of the weights, for example, if the centroid vertex C is determined, for example, based on the weighted sum (and the weights $w_i$ may not necessarily sum to one). This formulation may be equivalent to determining each weight of the weights $w_i$ as a fraction of the total sum of the weights $w_i$. As described herein, the weights $w_i$ may need to be determined or approximated, for example, to ensure continuity and/or result in a location of the centroid vertex being equidistant (or close to equidistant) from the TriSoup vertices $V_1$ of the cuboid.

FIG. 14B shows an example of determining the weights of the TriSoup vertices. More specifically, FIG. 14B shows that the areas (e.g., $S_{i-1/2}$ and $S_{i+1/2}$) of triangles (e.g., $\mathcal{T}_{i\ -1/2}$ and $\mathcal{T}_{i\ +1/2}$) may be used to determine the weights (e.g., $w_i$) of the TriSoup vertices (e.g., $V_i$). A centroid vertex (e.g., centroid vertex C as shown in FIG. 14A) may be determined, for example, based on the weights (e.g., $w_i$) of TriSoup vertices (e.g., $V_i$).

As described herein with respect to FIG. 14B, it is known from physics that there exists a point that fulfills these conditions: the center of gravity G of a surface $\mathcal{S}$ made of the compound (or combination or union) of the triangles $\mathcal{T}_{i\ +1/2}$ having vertices C, $V_i$, and $V_{i+1}$. If the surface $\mathcal{S}$ has uniform density ρ, the center of gravity G is defined by:

$$0 = \int_{\mathcal{S}} \overrightarrow{GM} dm = \int_{\mathcal{S}} \overrightarrow{GM} \rho ds$$

where M is a point over the surface $\mathcal{S}$, dm is the local infinitesimal mass at point M, and ds is the local element of surface at point M. By introducing an arbitrary coordinate origin O, the center of gravity G may be defined alternatively by:

$$0 = \int_{\mathcal{S}} \left( \overrightarrow{GO} + \overrightarrow{OM} \right) ds$$

and then $$\overrightarrow{OG} = \frac{1}{S} \int_{\mathcal{S}} \overrightarrow{OM} ds$$

where S is the total area defined by $S = \int_{\mathcal{S}} ds$. By splitting the surface $\mathcal{S}$ into the triangles $\mathcal{T}_{i\ +1/2}$ having respective area $S_{i+1/2}$, as described herein with respect to FIG. 14B, one obtains:

$$\overrightarrow{OG} = \frac{1}{S} \sum_i \int_{\mathcal{T}_{i+1/2}} \overrightarrow{OM} ds = \frac{1}{S} \sum_i S_{i+1/2} \overrightarrow{OG_{i+1/2}}$$

where $G_{i+1/2}$ is the center of gravity of the triangle $\mathcal{T}_{i\ +1/2}$ that is known to be defined simply by:

$$G_{i+1/2} = (C + V_i + V_{i+1})/3$$

Dropping the origin O in the notation and using directly point coordinates, the center of gravity G fulfils the equality:

$$G = \frac{1}{S} \sum_i S_{i+1/2} G_{i+1/2} =$$

27

-continued $$\frac{1}{3S}\sum_i S_{i+1/2}(C+V_i+V_{i+1}) = \frac{1}{3}C + \frac{2}{3S}\sum_i \frac{S_{i-1/2}+S_{i+1/2}}{2}V_i$$

and then:

$$\frac{3}{2}\left(G-\frac{1}{3}C\right) = \frac{1}{S}\sum_i \frac{S_{i-1/2}+S_{i+1/2}}{2}V_i$$

For example, to determine the centroid vertex C to be close to the center of gravity G, the equality as described herein may be simplified using G=C to obtain:

$$C = \frac{1}{S}\sum_i \frac{S_{i-1/2}+S_{i+1/2}}{2}V_i$$

and the centroid vertex C is effectively obtained as a weighted sum of the TriSoup vertices, and the weights may fulfill the following equality:

$$w_i = (S_{i-1/2}+S_{i+1/2})/(2S)$$

The sum of the weights is equal to unity (e.g., 1).

$$\sum_i w_i = 1$$

The centroid vertex C may be determined, for example, based on a weighted average over the TriSoup vertices that belong to the cuboid of the centroid vertex C. Each weight (e.g., $w_i$) for a vertex (e.g., $V_1$) may be determined, for example, as an average of the areas $S_{i+1/2}$ of the TriSoup triangles and $\mathcal{T}_{i+1/2}$ formed by triples including the vertex $V_i$. The centroid vertex C may be determined, for example, as the center of gravity, as described herein. A causality issue may arise, for example, because one may need to know the centroid vertex C to determine the TriSoup triangles (e.g., $\mathcal{T}_{i-1/2}$ and $\mathcal{T}_{i+1/2}$), their areas (e.g., $S_{i-1/2}$ and $S_{i+1/2}$), and the weights $w_i$ to compute the centroid vertex C as a weighted sum. The centroid vertex C is at both the beginning and the end of the causal chain. Each of the weights (e.g., $w_i$) for a vertex $V_i$ may be determined, for example, based on representative values of the areas (e.g., $S_{i-1/2}$ and $S_{i+1/2}$) of the TriSoup triangles (e.g., $\mathcal{T}_{i-1/2}$ and $\mathcal{T}_{i+1/2}$) formed by triples including the vertex $V_i$.

An initial centroid vertex $C_0$ may be determined from the TriSoup vertices, from which the TriSoup triangles may be constructed, for example, to avoid the causal issue. The initial centroid vertex $C_0$ may be any approximation of the centroid vertex C, for example, the initial centroid vertex $C_0$ may be obtained from the simple (non-weighted) average over the TriSoup vertices (e.g., as in the prior art). By using the initial centroid vertex $C_0$ to generate the weights of the vertices, from which a weighted sum (or average) of the vertices is calculated, for example, to determine the centroid vertex C. The resulting centroid vertex (e.g., the centroid vertex C) may be close to the optimal centroid vertex.

The triangle areas (e.g., $S_{i-1/2}$ and $S_{i+1/2}$) may be approximated without knowledge of the exact location of the triangles, for example, to avoid the causal issue. The approximation of the triangle areas (e.g., $S_{i-1/2}$ and $S_{i+1/2}$) may be computed without any prior knowledge of the centroid vertex C and/or its approximation $C_0$.

FIG. 15 shows an example method of determining a centroid vertex. More specifically, FIG. 15 shows a flowchart 1500 of example method steps for determining a centroid vertex from vertices (e.g., TriSoup vertices) of a cuboid (e.g., associated with a TriSoup node) corresponding to a portion of a point cloud. One or more steps of the example flowchart 1500 may be implemented by a decoder (e.g., decoder 120 as shown in FIG. 1) and/or by an encoder (e.g., encoder 114 as shown in FIG. 1).

At step 1502, an ordering of vertices (Vi) on a boundary of a cuboid may be determined. The boundary may include edges or the cuboid and/or faces of the cuboid. As described herein with respect to FIG. 11, FIG. 12A, FIG. 12B, FIG. 13, FIG. 14A and/or FIG. 14B, the vertices may be located on edges of the cuboid. For example, each vertex may be located on a different edge of the cuboid. There may be at least three vertices or at least four vertices, which may be determined as described herein with respect to FIG. 8A, FIG. 8B, FIG. 12A, and/or FIG. 12B. The vertices $V_i$ may be ordered, for example, based on a dominant direction, selected from a direction parallel to one of the three axis in 3D space, determined based on the vertices $V_i$ (e.g., as described with respect to FIG. 8A).

At step 1504, weights may be determined for the vertices. Each of the weights (e.g., $w_i$) of a respective vertex (e.g., $V_i$) of the vertices may be based on values representative of areas of triangles formed by triples of the vertex $V_i$, a centroid vertex C to be determined, and one adjacent vertex of the vertex in the ordering (e.g., as shown in FIG. 8A, FIG. 8B, and FIG. 13).

An initial centroid vertex $C_0$ may be determined from the TriSoup vertices $V_i$, for example, to determine the centroid vertex C. For example, the initial centroid vertex $C_0$ may be determined, for example, as the simple mean of the TriSoup vertices, $C_0=\Sigma_i V_i/N$, where N is the quantity/number of TriSoup vertices $V_i$.

The initial centroid vertex $C_0$ may be determined as the center of the cuboid associated with the TriSoup node.

If the initial centroid vertex $C_0$ is determined, triangles may be formed by the triples consisting of the initial centroid vertex $C_0$ and adjacent vertices, following the ordering of vertices $V_1$. The values $\alpha_{i+1/2}$, which approximate (or are representative of) the areas $S_{i+1/2}$ of triangles $\mathcal{T}_{i+1/2}$ may be computed. The weights $w_i$ may be determined, for example, based on the approximation values $\alpha_{i+1/2}$. For example, the weight $w_i$, associated with a vertex $V_i$, may be determined as the averaged value of the two approximation values $\alpha_{i-1/2}$ and $\alpha_{i+1/2}$ of the areas of the two triangles $\mathcal{T}_{i-1/2}$ and $\mathcal{T}_{i+1/2}$ that have TriSoup vertex $V_i$ as a common vertex, as shown in FIG. 14B. For example, the weight $w_i$ may be computed as:

$$w_i = (a_{i-1/2}+a_{i+1/2})/2A$$

where A is the sum $\Sigma_i \alpha_{i+1/2}$ of all area approximations. The sum of the weights is equal to one.

If the initial centroid vertex $C_0$ is determined, the area approximation $\alpha_{i+1/2}$ may be computed as the area, or an approximation of the area, of the triangle $\mathcal{T}_{i+1/2}$ defined by the vertices $V_i$, $V_{i+1}$ and $C_0$. For example, this area may be obtained by the cross product of two edges of the triangle $\mathcal{T}_{i+1/2}$. The area approximation $\alpha_{i+1/2}$ may be determined (e.g., calculated) as:

$$a_{i+1/2} = \left\| \overrightarrow{C_0 V_i} \times \overrightarrow{C_0 V_{i+1}} \right\|$$

where the norm $\|\cdot\|$ may be the Euclidian norm (e.g., also referred to as the L2 norm, which provides the true area) or any other norm such as the Manhattan norm (e.g., also referred to as L1 norm) to simplify and reduce computation.

The values representative of the areas of triangles at step 1504 may be determined without determining the initial (or any other) centroid vertex $C_0$. For example, area approximations $\alpha_{i+1/2}$ may be determined, for example, based on the edge lengths of subsequently determined (or rendered) triangles $\mathcal{T}_{i+1/2}$ by using the length of the edge $\overrightarrow{V_i V_{i+1}}$, which is independent of the centroid vertex $C$ to be subsequently determined. The areas $S_{i+1/2}$ or their approximations $\alpha_{i+1/2}$ may be proportional to the length of the edge $\overrightarrow{V_i V_{i+1}}$, for example, because the future, to-be-determined centroid vertex $C$ may be located approximately equidistant from the TriSoup vertices $V_i$. For example, the area approximation $\alpha_{i+1/2}$ for a triangle may be determined (e.g., computed), for example, based on a value representative of a distance between the vertex $V_i$ and its adjacent vertex $V_{i+1}$ as follows:

$$a_{i+1/2} \approx \left\| \overrightarrow{V_i V_{i+1}} \right\|$$

where the norm $\|\cdot\|$ may be the Euclidian norm (e.g., also referred to as the L2 norm, which provides the true area) or any other norm such as the Manhattan norm (e.g., also referred to as L1 norm) to simplify and reduce computation.

The L1-norm may be used as the distance metric between the vertex and an adjacent vertex in the ordering as follows:

$$a_{i+1/2} = \left\| \overrightarrow{V_i V_{i+1}} \right\|_1$$

to provide the best tradeoff in compression results and fast implementation. The area approximation $\alpha_{i+1/2}$ may be the sum of the absolute values of the three coordinates of the vector $\overrightarrow{V_i V_{i+1}}$.

At step 1506, the centroid vertex $C$ may be determined, for example, based on a sum of the vertices weighted by their respective weights, as determined at step 1504. For example, the centroid vertex $C$ may be determined as the weighted sum of TriSoup vertices (e.g., $C = \Sigma_i w_i V_i$).

FIG. 16 shows an example method of obtaining a portion of a point cloud in a cuboid. The portion of the point cloud may be represented, for example, at least by a determined centroid vertex. More specifically, FIG. 16 shows a flowchart 1600 of example method steps for determining a centroid vertex from vertices (e.g., TriSoup vertices) of a cuboid (e.g., associated with a TriSoup node) corresponding to a portion of a point cloud. One or more steps of the example flowchart 1600 may be implemented by a decoder (e.g., decoder 120 as described herein with respect to FIG.

1) or by an encoder (e.g., encoder 114 as described herein with respect to FIG. 1). The decoder and encoder may perform reciprocal operations, for example, unless explicitly stated otherwise.

At step 1602, a plurality of vertices of a cuboid corresponding to a portion of a point cloud may be determined. For example, the plurality of vertices may include at least three vertices or at least four vertices. The plurality of vertices may be on a boundary of the cuboid. For example, the boundary may include edges of the cuboid. For example, the boundary may include edges and/or faces of the cuboid. For example, the plurality of vertices may be on three or more edges of the edges of the cuboid.

At the decoder, determining the plurality of vertices may include, for each vertex of the plurality of vertices, decoding (e.g., entropy decoding) from a bitstream: a presence of the vertex on an edge of the cuboid, and a position of the vertex along the edge. At the encoder, the plurality of vertices of the cuboid may be determined, for example, based on spatial positions of points in the portion of the point cloud relative to the edges of the cuboid, as described herein with respect to FIG. 12A and FIG. 12B. The encoder may encode (e.g., entropy encode) an indication of the presence of the vertex on the edge and, if present, an indication of the position of the vertex along the edge.

Each of the neighboring vertices may be adjacent to the vertex in an ordering of the plurality of vertices. The pairs of vertices (e.g., referenced at step 1602) may be adjacent vertices in the ordering. An initial centroid vertex of the cuboid and/or the ordering of the plurality of vertices may be determined, for example, by pivoting around a dominant direction selected (or determined) from one of three directions corresponding to the three axis in 3D space. For example, the dominant direction may be determined, for example, based on the initial centroid vertex and the plurality of vertices, as described herein with respect to FIG. 8A. The initial centroid vertex may be determined as a mean of the plurality of vertices.

The ordering may be a cyclic ordering (e.g., referred to as a circular ordering). For example, the ordering of the plurality of vertices may be performed, for example, using a circular buffer or an array with index management such that the first vertex and the last vertex of the array may be considered adjacent and/or neighboring to each other. For example, the neighboring plurality of vertices of the vertex may include: a first neighboring vertex having a first index equal to a remainder of one less than an index of the vertex divided by a quantity of the plurality of vertices, and a second neighboring vertex having a second index equal to a remainder of one plus the index of the vertex divided by the quantity of the plurality of vertices.

At step 1604, a centroid vertex of the cuboid may be determined. The centroid vertex of the cuboid may be determined, for example, based on a weighted sum of the plurality of vertices. Each vertex of the plurality of vertices may have a weight, for example, based on neighboring vertices, from the plurality of vertices, of the vertex. The weight may be determined, for example, based on values representative of distances between the vertex and each of the neighboring vertices. For example, the values representative of distances may include L1 norms (e.g., referred to as Manhattan norms) or L2 norms (e.g., referred to as Euclidean norms). The weight may be determined, for example, as a sum of the values. The centroid vertex may be, for example, based on the weighted sum divided by a sum of weights corresponding to the plurality of vertices. The weight may be determined, for example, as an average (e.g., referred to as mean) of the values. The centroid vertex may be, for example, based on the weighted average divided by an average of weights corresponding to the plurality of vertices. The weight may be determined, for example, as a sum of the values divided by a sum of weights corresponding to the plurality of vertices. The values may include: a first value representative of a first distance between the vertex and a first neighboring vertex of the neighboring vertices, and/or a second value representative of a second distance between the vertex and a second neighboring vertex of the neighboring vertices.

The weighted sum may be determined, for example, as a linear combination of the plurality of vertices, divided by the sum of the weights, where the coefficients of the linear combination correspond to the weights of the plurality of vertices. The weight may be determined, for example, based on a cross product of edges formed between the vertex and each of the neighboring vertices. The weight of each vertex may be proportional to a mean (or a sum) of areas of two triangles, of the triangles, generated from the vertex. For example, the weight of each vertex may be representative of a mean (or a sum) of areas of two triangles, of the triangles, generated from the vertex. The weights may be determined, for example, based on triangles constructed from the initial centroid vertex, described herein. For example, the weight of each vertex may be determined, for example, based on: a first value representative of a first area of a first triangle formed by the vertex, the initial centroid vertex, and a first neighboring vertex of the neighboring vertices; and/or a second value representative of a second area of a second triangle formed by the vertex, the initial centroid vertex, and a second neighboring vertex of the neighboring vertices of the vertex.

The first value may be determined, for example, as a first cross product of two edges of the first triangle or half of the first cross product. The second value may be determined, for example, as a second cross product of two edges of the second triangle or half of the second cross product.

The weight of the vertex may be determined, for example, as being proportional to a sum of the first value and the second value. The weight may be determined, for example, as the sum of the first value and the second value. The weight may be determined, for example, as half of the sum of the first value and the second value.

The weight of the vertex may be determined, for example, as being proportional to a mean of the first value and the second value. The weight may be determined, for example, as the mean of the first value and the second value. The weight may be determined, for example, as half of the mean of the first value and the second value.

At step 1606, triangles may be determined. The triangles may be determined, for example, based on the centroid vertex and pairs of the plurality of vertices. A quantity/number of the plurality of vertices may be equal to the quantity/number of triangles. Each of the triangles may be formed by the centroid vertex and different adjacent vertices in an ordering of the plurality of vertices (e.g., the ordering of the plurality of vertices as described herein with respect to FIG. 15 and at step 1604 in FIG. 16). Consistency and quality of voxelization of the triangles may be improved by adjusting the centroid vertex. The consistency and quality of voxelization of the triangles may be improved by adjusting the centroid vertex, for example, based on a centroid residual, as described herein with respect to FIG. 11.

At the decoder, determining the triangles may include, for example, decoding (e.g., entropy decoding) a centroid residual from a bitstream. The decoder may determine a second centroid vertex, for example, based on the centroid vertex and the centroid residual. Each of the triangles including a set of three vertices may comprise the second centroid vertex and two other vertices that may be adjacent in an ordering of the plurality of vertices. The centroid residual may be decoded from the bitstream by the decoder, which may decode (e.g., entropy decode) a first indication to determine whether the centroid residual is equal to zero. Based on the first indication that the centroid residual is non-zero, the decoder may decode (e.g., entropy decode) a second indication of a sign of the centroid residual, and/or a third indication associated with a magnitude of the centroid residual. The third indication may indicate a value equal to one less than the magnitude of the centroid residual. The decoder may determine the centroid residual as the value (e.g., indicated by and/or decoded from the third indication) plus one.

At the encoder, the encoder may determine the centroid residual, for example, based on the centroid vertex and the portion of the point cloud. Each of the triangles including a set of three vertices may comprise the second centroid vertex and two other vertices that may be adjacent in an ordering of the plurality of vertices. The encoder may encode the centroid residual in a bitstream. The encoder may determine the triangles (e.g., TriSoup triangles), for example, based on the centroid vertex and pairs of the plurality of vertices. The encoder may calculate the normalized vector, for example, based on an average normal of the triangles, with the centroid residual being along the normalized vector.

The encoder may determine a second centroid vertex along the normalized vector, for example, based on an average of a set of point, in the portion of the point cloud, within a threshold distance of a line extending from both ends of the normalized vector. The centroid residual may be equal to a difference between the second centroid vertex and the centroid vertex. At step 1608, the triangles may be voxelized to determine voxels representing the portion of the point cloud, as described herein with respect to FIG. 9 and FIG. 10.

FIG. 17A shows an example method of encoding a centroid residual for a centroid vertex. More specifically, FIG. 17A shows a flowchart 1700 of example method steps for encoding (e.g., entropy encoding) a centroid residual for a centroid vertex determined from vertices (e.g., TriSoup vertices) of a cuboid (e.g., associated with a TriSoup node) corresponding to a portion of a point cloud. One or more steps of the example flowchart 1700 may be implemented by an encoder (e.g., encoder 114 as described herein with respect to FIG. 1).

At step 1702, the encoder may determine vertices (e.g., TriSoup vertices) of a cuboid corresponding to a portion of a point cloud. For example, the cuboid may be indicated by a TriSoup node. Step 1702 may correspond to step 1602, as described herein with respect to FIG. 16.

At step 1704, the encoder may determine a centroid vertex of the cuboid, for example, based on a weighted sum of the first vertices. Each vertex of the first vertices may have a respective weight, of weights, for example, based on neighboring vertices, from the vertices, of the vertex. Step 1704 may correspond to step 1604, as described herein with respect to FIG. 16.

At step 1706, the encoder may determine a centroid residual, for example, based on the centroid vertex and the portion of the point cloud. For example, the centroid residual may be determined from the centroid vertex, as described herein with respect to FIG. 11.

The encoder may determine triangles (e.g., TriSoup triangles), for example, based on the centroid vertex and pairs of the vertices, as described herein with respect to FIG. 8A, FIG. 8B, FIG. 13, FIG. 14A, and FIG. 14B. The encoder may determine (e.g., calculate) a normalized vector (e.g., referred to as a unit vector), for example, based on an average normal of the triangles. The centroid residual may be along the normalized vector. The encoder may determine a second centroid vertex along the normalized vector, for example, based on an average of a set of points, in the portion of the point cloud, within a threshold distance of a line extending from both ends of the normalized vector, as described herein with respect to FIG. 11. The centroid residual may be determined, for example, as a difference between the second centroid vertex and the centroid vertex.

At step 1708, the encoder may encode (e.g., entropy encode) the centroid residual in a bitstream, as described herein with respect to FIG. 11. The encoder may encode the centroid residuals, for example, using a set of syntax elements (e.g., referred to as indications or flags). For example, the encoder may encode (e.g., entropy encode) a first indication of whether the centroid residual is equal to zero. For example, based on the first indication that the centroid residual is non-zero, the encoder may encode (e.g., entropy encode) a second indication of a sign of the centroid residual, and/or a third indication associated with a magnitude of the centroid residual. For example, the third indication may be encoded as a unary-code codeword (e.g., using a truncated unary code scheme). If the first indication indicates that the centroid residual is non-zero, the third indication may indicate a value equal to one less than the magnitude of the centroid residual. The centroid residual may be equal to the value plus one.

The encoder may determine triangles (e.g., TriSoup triangles), for example, based on the centroid vertex and pairs of the vertices, as described herein with respect to FIG. 8A, FIG. 8B, FIG. 13, FIG. 14A, and/or FIG. 14B. The encoder may determine (e.g., calculate) a normalized vector (e.g., referred to as a unit vector), for example, based on an average normal of the triangles. The centroid residual may be along the normalized vector. The encoder may determine a second centroid vertex along the normalized vector, for example, based on an average of a set of points, in the portion of the point cloud, within a threshold distance of a line extending from both ends of the normalized vector, as described herein with respect to FIG. 11. The centroid residual may be determined, for example, as a difference between the second centroid vertex and the centroid vertex.

FIG. 17B shows an example method of decoding a centroid residual for a centroid vertex. More specifically, FIG. 17B shows a flowchart 1750 of example method steps for decoding (e.g., entropy decoding) a centroid residual for a centroid vertex determined from vertices (e.g., TriSoup vertices) of a cuboid (e.g., associated with a TriSoup node) corresponding to a portion of a point cloud. One or more steps of the example flowchart 1750 may be implemented by a decoder (e.g., decoder 120 as described herein with respect to FIG. 1).

At step 1752, the decoder may determine vertices (e.g., TriSoup vertices) of a cuboid corresponding to a portion of a point cloud. For example, the cuboid may be indicated by a TriSoup node. Step 1752 may correspond to step 1602, as described herein with respect to FIG. 16. At step 1754, the decoder may determine a centroid vertex of the cuboid, for example, based on a weighted sum of the first vertices. Each vertex of the first vertices may have a respective weight, of weights, for example, based on neighboring vertices, from the vertices, of the vertex. Step 1754 may correspond to step 1604, as described herein with respect to FIG. 16.

At step 1756, the decoder may decode (e.g., entropy decode) a centroid residual from a bitstream (e.g., as described herein with respect to FIG. 11). The decoder may decode centroid residuals, for example, using a set of syntax elements (e.g., referred to as indications or flags). For example, the decoder may decode a first indication to determine whether the centroid residual is equal to zero. For example, based on the first indication that the centroid residual is non-zero, the decoder may decode a second indication of a sign of the centroid residual, and/or a third indication associated with a magnitude of the centroid residual. For example, the third indication may be decoded as a unary-code codeword (e.g., using a truncated unary code scheme). If the first indication indicates that the centroid residual is non-zero, the third indication may indicate a value equal to one less than the magnitude of the centroid residual. The centroid residual may be equal to the value plus one.

At step 1758, the decoder may determine a second centroid residual (e.g., $C+C_{res}$ or an adjusted centroid by a centroid residual). The decoder may determine a second centroid residual (e.g., $C+C_{res}$ or an adjusted centroid by a centroid residual as described herein with respect to FIG. 8B), for example, based on the centroid vertex and the decoded centroid residual from a bitstream.

Figure 18:
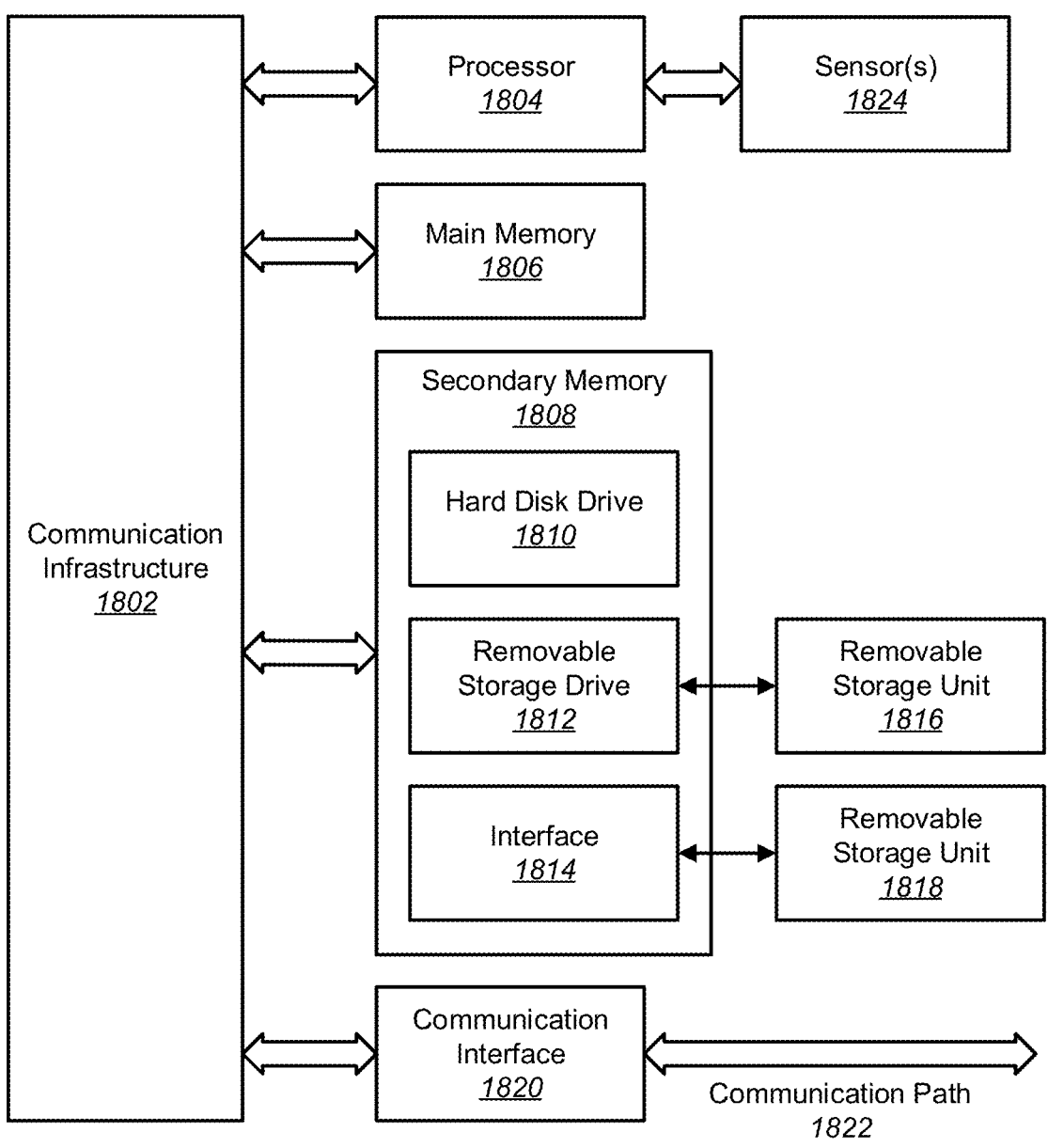
FIG. 18 shows a block diagram of an example computer system in which examples of the present disclosure may be implemented.

FIG. 18 shows an example computer system 1800 in which examples of the present disclosure may be implemented. For example, the example computer system 1800 shown in FIG. 18 may implement one or more of the methods described herein. For example, various devices and/or systems described herein (e.g., in FIGS. 1, 2, and 3) may be implemented in the form of one or more computer systems 1800. Furthermore, each of the steps of the flowcharts depicted in this disclosure may be implemented on one or more computer systems 1800.

The computer system 1800 may comprise one or more processors, such as a processor 1804. The processor 1804 may be a special purpose processor, a general purpose processor, a microprocessor, and/or a digital signal processor. The processor 1804 may be connected to a communication infrastructure 1802 (for example, a bus or network). The computer system 1800 may also comprise a main memory 1806 (e.g., a random access memory (RAM)), and/or a secondary memory 1808.

The secondary memory 1808 may comprise a hard disk drive 1810 and/or a removable storage drive 1812 (e.g., a magnetic tape drive, an optical disk drive, and/or the like). The removable storage drive 1812 may read from and/or write to a removable storage unit 1816. The removable storage unit 1816 may comprise a magnetic tape, optical disk, and/or the like. The removable storage unit 1816 may be read by and/or may be written to the removable storage drive 1812. The removable storage unit 1816 may comprise a computer usable storage medium having stored therein computer software and/or data.

The secondary memory 1808 may comprise other similar means for allowing computer programs or other instructions to be loaded into the computer system 1800. Such means may include a removable storage unit 1818 and/or an interface 1814. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 1818 and interfaces 1814 which may allow software and/or data to be transferred from the removable storage unit 1818 to the computer system 1800.

The computer system 1800 may also comprise a communications interface 1820. The communications interface 1820 may allow software and data to be transferred between the computer system 1800 and external devices. Examples of the communications interface 1820 may include a modem, a network interface (e.g., an Ethernet card), a communications port, etc. Software and/or data transferred via the communications interface 1820 may be in the form of signals which may be electronic, electromagnetic, optical, and/or other signals capable of being received by the communications interface 1820. The signals may be provided to the communications interface 1820 via a communications path 1822. The communications path 1822 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 1816 and 1818 or a hard disk installed in the hard disk drive 1810. The computer program products may be means for providing software to the computer system 1800. The computer programs (which may also be called computer control logic) may be stored in the main memory 1806 and/or the secondary memory 1808. The computer programs may be received via the communications interface 1820. Such computer programs, when executed, may enable the computer system 1800 to implement the present disclosure as discussed herein. In particular, the computer programs, when executed, may enable the processor 1804 to implement the processes of the present disclosure, such as any of the methods described herein. Accordingly, such computer programs may represent controllers of the computer system 1800.

Features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

Figure 19:
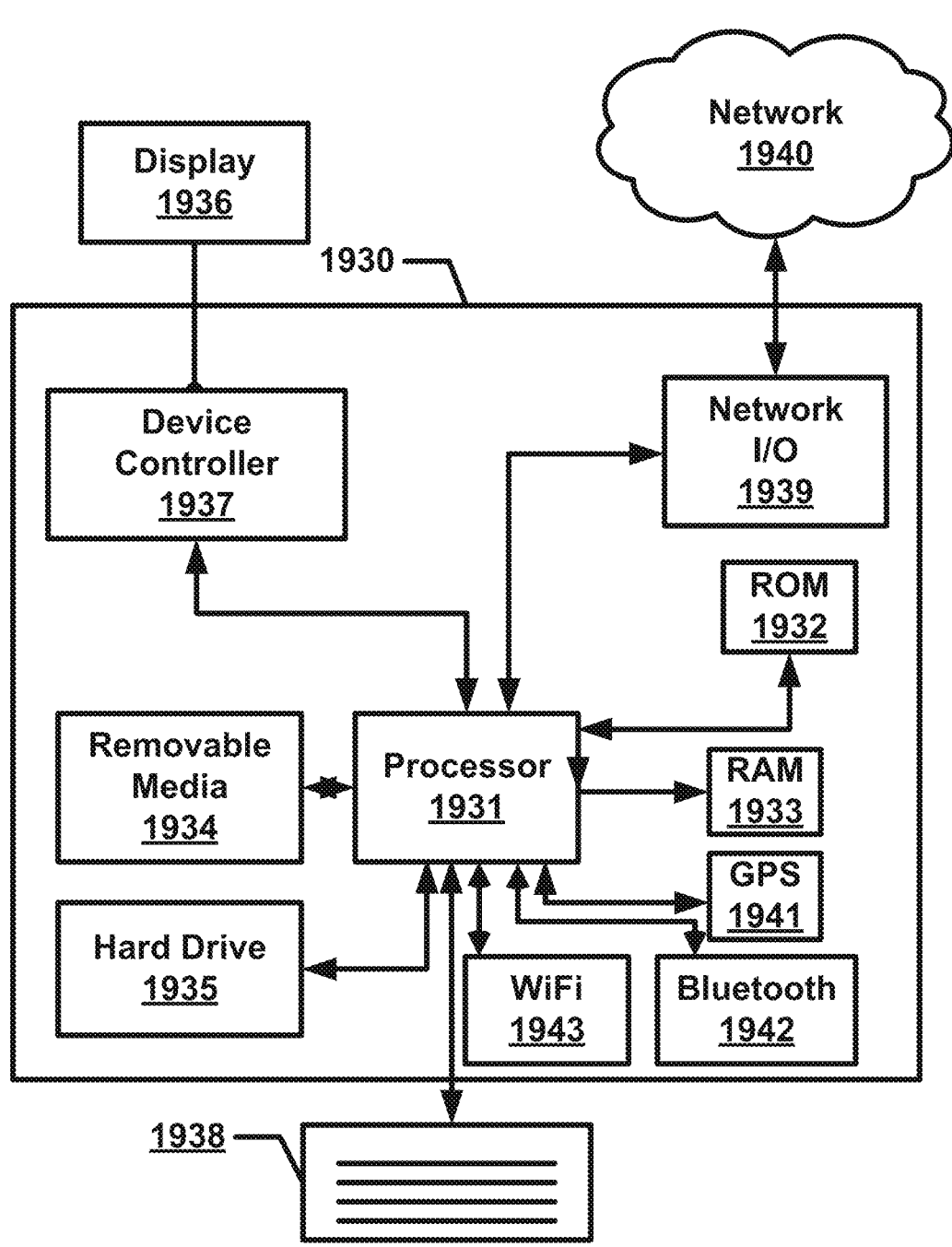
FIG. 19 shows example elements of a computing device that may be used to implement any of the various devices described herein.

FIG. 19 shows example elements of a computing device 1930 that may be used to implement any of the various devices described herein, including, for example, a source device (e.g., 102), an encoder (e.g., 200), a destination device (e.g., 106), a decoder (e.g., 300), and/or any computing device described herein. The computing device 1930 may include one or more processors 1931, which may execute instructions stored in the random-access memory (RAM) 1933, the removable media 1934 (such as a Universal Serial Bus (USB) drive, compact disk (CD) or digital versatile disk (DVD), or floppy disk drive), or any other desired storage medium. Instructions may also be stored in an attached (or internal) hard drive 1935. The computing device 1930 may also include a security processor (not shown), which may execute instructions of one or more computer programs to monitor the processes executing on the processor 1931 and any process that requests access to any hardware and/or software components of the computing device 1930 (e.g., ROM 1932, RAM 1933, the removable media 1934, the hard drive 1935, the device controller 1937, a network interface 1939, a GPS 1941, a Bluetooth interface 1942, a WiFi interface 1943, etc.). The computing device 1930 may include one or more output devices, such as the display 1936 (e.g., a screen, a display device, a monitor, a television, etc.), and may include one or more output device controllers 1937, such as a video processor. There may also be one or more user input devices 1938, such as a remote control, keyboard, mouse, touch screen, microphone, etc. The computing device 1930 may also include one or more network interfaces, such as a network interface 1939, which may be a wired interface, a wireless interface, or a combination of the two. The network interface 1939 may provide an interface for the computing device 1930 to communicate with a network 1940 (e.g., a RAN, or any other network). The network interface 1939 may include a modem (e.g., a cable modem), and the external network 1940 may include communication links, an external network, an in-home network, a provider's wireless, coaxial, fiber, or hybrid fiber/coaxial distribution system (e.g., a DOCSIS network), or any other desired network. Additionally, the computing device 1930 may include a location-detecting device, such as a global positioning system (GPS) microprocessor 1941, which may be configured to receive and process global positioning signals and determine, with possible assistance from an external server and antenna, a geographic position of the computing device 1930.

The example in FIG. 19 may be a hardware configuration, although the components shown may be implemented as software as well. Modifications may be made to add, remove, combine, divide, etc. components of the computing device 1930 as desired. Additionally, the components may be implemented using basic computing devices and components, and the same components (e.g., processor 1931, ROM storage 1932, display 1936, etc.) may be used to implement any of the other computing devices and components described herein. For example, the various components described herein may be implemented using computing devices having components such as a processor executing computer-executable instructions stored on a computer-readable medium, as shown in FIG. 19. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine a plurality of vertices of a cuboid that may be associated with a portion of a point cloud associated with content. The computing device may determine a centroid vertex of the cuboid, for example, based on a weighted sum of the plurality of vertices. Each vertex of the plurality of vertices may have a weight, for example, based on neighboring vertices, of the plurality of vertices, of the vertex. The computing device may determine triangles, for example, based on the centroid vertex and pairs of the plurality of vertices. The computing device may voxelize the triangles to determine voxels representing the portion of the point cloud. The computing device may decode (e.g., entropy decode) a centroid residual from a bitstream. The computing device may determine a second centroid vertex based on the centroid vertex and the centroid residual. Each of the triangles may comprise a triple of vertices, of the plurality of vertices, comprising the second centroid vertex and different adjacent vertices in an ordering of the plurality vertices. The computing device may decode a centroid residual from a bitstream. The computing device may decode a first indication to determine whether the centroid residual is equal to zero. The computing device may render, for example, based on at least one voxel of the voxels, a point cloud frame associated with the portion of the point cloud. The weight may be based on distances between the vertex and each of the neighboring vertices. The weight of each vertex may be proportional to a mean or a sum of areas of two triangles, of the triangles, associated with the vertex. The determining the plurality of vertices may comprise, for each vertex of the vertices, decoding from a bitstream: a presence of the vertex on an edge of the cuboid; and a position of the vertex along the edge. The plurality of vertices may be on a boundary of the cuboid. The plurality of vertices may comprise at least three vertices or at least four vertices. The pairs of the plurality of vertices are adjacent vertices in the ordering. The ordering may be a cyclic ordering. The computing device may determine an initial centroid vertex of the cuboid. The computing device may determine the ordering of the plurality of vertices based on pivoting around a direction determined. The neighboring vertices may comprise: a first neighboring vertex having a first index equal to a remainder of one less than an index of the vertex divided by a quantity of the vertices; and a second neighboring vertex having a second index equal to a remainder of one plus the index of the vertex divided by the quantity of the vertices. The computing device may determine an initial centroid vertex of the cuboid. The computing device may determine the ordering of the plurality of vertices by pivoting around a dominant direction determined, as one of three directions corresponding to the three axis in 3D space, based on the initial centroid vertex and the plurality of vertices. The initial centroid vertex may be determined as a mean of the plurality of vertices. The values representative of distances may comprise L1 norms (also referred to as Manhattan norms) or L2 norms (also referred to as Euclidean norms). The values may comprise: a first value representative of a first distance between the vertex and a first neighboring vertex of the neighboring vertices; and a second value representative of a second distance between the vertex and a second neighboring vertex of the neighboring vertices. The weight may be determined as a sum or a mean of the values. The centroid vertex may be further based on the weighted sum divided by a sum or a mean of weights corresponding to the plurality of vertices. The weight may be determined as a sum of the values divided by a sum of weights corresponding to the plurality of vertices. The weight may be based on a cross product of edges formed between the vertex and each of the neighboring vertices. The weight of each vertex may be determined further based on: a first value representative of a first area of a first triangle formed by the vertex, the initial centroid vertex, and a first neighboring vertex of the neighboring vertices; and a second value representative of a second area of a second triangle formed by the vertex, the initial centroid vertex, and a second neighboring vertex of the neighboring vertices of the vertex. The first value may be determined as a first cross product of two edges of the first triangle or half of the first cross product, and wherein the second value may be determined as a second cross product of two edges of the second triangle or half of the second cross product. The weight may be determined as: a sum of the first value and the second value; or a mean of the first value and the second value. The weight of the vertex may be proportional to the mean of the first value and the second value. The boundary may comprise edges and faces of the cuboid, and wherein the plurality of vertices are on three or more edges of the edges of the cuboid. Each of the triangles may be formed by the centroid vertex and different adjacent vertices in an ordering of the plurality of vertices. The decoding may comprise decoding, for example, based on the first indication that the centroid residual is non-zero: a second indication of a sign of the centroid residual; and a third indication associated with a magnitude of the centroid residual. The third indication may indicate a value equal to one less than the magnitude of the centroid residual, and wherein the centroid residual is determined as the value plus one. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the point cloud. A computer-readable medium may store instructions that, when executed, cause performance of the described method, additional operations and/or include the additional elements.

A computing device may perform a method comprising multiple operations. The computing device may determine a plurality of vertices of a cuboid that may be associated with a portion of a point cloud associated with content. The computing device may determine a centroid vertex of the cuboid, for example, based on a weighted sum of the plurality of vertices. Each vertex of the plurality of vertices may have a weight based on neighboring vertices, of the plurality of vertices, of the vertex. The computing device may determine a centroid residual, for example, based on the centroid vertex and the portion of the point cloud. Each of triangles may comprise a triple of vertices, of the plurality of vertices, comprising a second centroid vertex and different adjacent vertices. The computing device may encode (e.g., entropy encode) the centroid residual in a bitstream. The computing device may determine triangles based on the centroid vertex and pairs of the plurality of vertices. The computing device may calculate a normalized vector based on an average normal of the triangles, wherein the centroid residual is along the normalized vector. The computing device may determine the second centroid vertex along the normalized vector, for example, based on an average of a set of points, in the portion of the point cloud, within a threshold distance of a line extending from both ends of a normalized vector. The centroid residual comprises a difference between the second centroid vertex and the centroid vertex. The weighted sum may be equal to a linear combination of the plurality of vertices divided by a sum of the weights, wherein coefficients of the linear combination may correspond to weights of the plurality of vertices. The weight of each vertex may be representative of a mean or a sum of areas of two triangles, of the triangles, associated with the vertex. A quantity of the plurality of vertices may be equal to the quantity of the triangles. The encoding may comprise encoding a first indication of whether the centroid residual is equal to zero. The computing device may determine triangles based on the centroid vertex and pairs of the plurality of vertices. The computing device may calculate a normalized vector based on an average normal of the triangles, wherein the centroid residual is along the normalized vector. The computing device may determine a second centroid vertex along the normalized vector based on an average of a set of point, in the portion of the point cloud, within a threshold distance of a line extending from both ends of the normalized vector. The centroid residual may comprise a difference between the second centroid vertex and the centroid vertex. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to decode the centroid residual. A computer-readable medium may store instructions that, when executed, cause performance of the described method, additional operations and/or include the additional elements.

A computing device may perform a method comprising multiple operations. The computing device may determine a plurality of vertices of a cuboid that may be associated with a portion of a point cloud associated with content. The computing device may determine a centroid vertex of the cuboid, for example, based on a weighted sum of the plurality of vertices. Each vertex of the plurality of vertices may have a respective weight, of a plurality of weights, based on neighboring vertices, of the plurality of vertices, of the vertex. The computing device may determine a centroid residual, for example, based on the centroid vertex and the portion of the point cloud. The computing device may code the centroid residual in a bitstream. The computing device may determine a plurality of triangles, for example, based on the centroid vertex and pairs of the plurality of vertices. The computing device may calculate a normalized vector, for example, based on an average normal of the plurality of triangles. The centroid residual may be along the normalized vector. The coding may comprise coding an indication of whether the centroid residual is equal to zero. The coding may comprise coding the centroid residual in the bitstream based on at least one of: a first indication indicating the centroid residual is non-zero; a second indication indicating a sign of the centroid residual; and a third indication associated with a magnitude of the centroid residual. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the point cloud. A computer-readable medium may store instructions that, when executed, cause performance of the described method, additional operations and/or include the additional elements.

A computing device may perform a method comprising multiple operations. The computing device may determine vertices of a cuboid corresponding to a portion of a point cloud. The computing device may determine a centroid vertex of the cuboid based on a weighted sum of the first vertices. Each vertex of the first vertices may have a respective weight, of weights, based on neighboring vertices, from the vertices, of the vertex. The computing device may determine a centroid residual based on the centroid vertex and the portion of the point cloud. The computing device may encode (e.g., entropy encode) the centroid residual in a bitstream. The computing device may determine triangles based on the centroid vertex and pairs of the vertices. The computing device may calculate a normalized vector based on an average normal of the triangles. The centroid residual may be along the normalized vector. The computing device may determine a second centroid vertex along the normalized vector based on an average of a set of point, in the portion of the point cloud, within a threshold distance of a line extending from both ends of the normalized vector. The centroid residual may comprise a difference between the second centroid vertex and the centroid vertex.

The encoding may comprise encoding a first indication of whether the centroid residual is equal to zero. The encoding may comprise encoding, based on the first indication that the centroid residual is non-zero: a second indication of a sign of the centroid residual; and a third indication associated with a magnitude of the centroid residual. The third indication indicates a value equal to one less than the magnitude of the centroid residual, and wherein the centroid residual is determined as the value plus one. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to decode the centroid residual. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   determining, by a computing device, a plurality of vertices of a cuboid associated with a portion of a point cloud associated with content;
   determining, by the computing device, a centroid vertex of the cuboid based on a weighted sum of the plurality of vertices, wherein each vertex of the plurality of vertices has a weight based on neighboring vertices, of the plurality of vertices, of the vertex;
   determining, by the computing device, triangles based on the centroid vertex and pairs of the plurality of vertices; and
   voxelizing, by the computing device, the triangles to determine voxels representing the portion of the point cloud.

2. The method of claim 1, wherein the determining the triangles further comprises:
   decoding a centroid residual from a bitstream; and
   determining a second centroid vertex based on the centroid vertex and the centroid residual, wherein each of the triangles comprises a triple of vertices, of the plurality of vertices, comprising the second centroid vertex and different adjacent vertices in an ordering of the vertices.

3. The method of claim 1, wherein the determining the triangles further comprises:

decoding a centroid residual from a bitstream, wherein the decoding comprises decoding a first indication to determine whether the centroid residual is equal to zero.

4. The method of claim 1, further comprising:

rendering, based on at least one voxel of the voxels, a point cloud frame associated with the portion of the point cloud.

5. The method of claim 1, wherein the weight is based on distances between the vertex and each of the neighboring vertices.

6. The method of claim 1, wherein the weight of each vertex is proportional to a mean or a sum of areas of two triangles, of the triangles, associated with the vertex.

7. The method of claim 1, wherein the determining the vertices comprises:

for each vertex of the vertices, decoding from a bitstream:
a presence of the vertex on an edge of the cuboid; and
a position of the vertex along the edge.

8. The method of claim 1, wherein the plurality of vertices is on a boundary of the cuboid.

9. The method of claim 1, wherein the plurality of vertices comprises at least three vertices or at least four vertices.

10. A method comprising:

determining, by a computing device, a plurality of vertices of a cuboid associated with a portion of a point cloud associated with content;

determining, by the computing device, a centroid vertex of the cuboid based on a weighted sum of the plurality of vertices, wherein each vertex of the plurality of vertices has a weight based on neighboring vertices, of the plurality of vertices, of the vertex;

determining, by the computing device, a centroid residual based on the centroid vertex and the portion of the point cloud, wherein each of triangles comprises a triple of vertices, of the plurality of vertices, comprising a second centroid vertex and different adjacent vertices; and encoding, by the computing device, the centroid residual in a bitstream.

11. The method of claim 10, further comprising:

determining triangles based on the centroid vertex and pairs of the plurality of vertices; and calculating a normalized vector based on an average normal of the triangles, wherein the centroid residual is along the normalized vector.

12. The method of claim 10, further comprising:

based on an average of a set of points, in the portion of the point cloud, within a threshold distance of a line extending from both ends of a normalized vector, determining the second centroid vertex along the normalized vector, wherein the centroid residual comprises a difference between the second centroid vertex and the centroid vertex.

13. The method of claim 10, wherein the weighted sum is equal to a linear combination of the plurality of vertices divided by a sum of the weights, wherein coefficients of the linear combination correspond to weights of the plurality of vertices.

14. The method of claim 10, wherein the weight of each vertex is representative of a mean or a sum of areas of two triangles, of the triangles, associated with the vertex.

15. The method of claim 10, wherein a quantity of the plurality of vertices is equal to the quantity of the triangles.

16. The method of claim 10, wherein the encoding comprises encoding a first indication of whether the centroid residual is equal to zero.

17. A method comprising:

determining, by a computing device, a plurality of vertices of a cuboid associated with a portion of a point cloud associated with content;

determining, by the computing device, a centroid vertex of the cuboid based on a weighted sum of the plurality of vertices, wherein each vertex of the plurality of vertices has a respective weight, of a plurality of weights, based on neighboring vertices, of the plurality of vertices, of the vertex;

determining, by the computing device, and based on the centroid vertex and the portion of the point cloud, a centroid residual; and coding, by the computing device, the centroid residual in a bitstream.

18. The method of claim 17, further comprising:

determining a plurality of triangles based on the centroid vertex and pairs of the plurality of vertices; and calculating a normalized vector based on an average normal of the plurality of triangles, wherein the centroid residual is along the normalized vector.

19. The method of claim 17, wherein the coding comprises coding an indication of whether the centroid residual is equal to zero.

20. The method of claim 17, wherein the coding comprises coding the centroid residual in the bitstream based on one or more of:

a first indication indicating the centroid residual is non-zero;

a second indication indicating a sign of the centroid residual; or a third indication associated with a magnitude of the centroid residual.

21. A non-transitory computer-readable medium storing instructions that, when executed, configure a computing device to:

determine a plurality of vertices of a cuboid associated with a portion of a point cloud associated with content;

determine a centroid vertex of the cuboid based on a weighted sum of the plurality of vertices, wherein each vertex of the plurality of vertices has a weight based on neighboring vertices, of the plurality of vertices, of the vertex;

determine triangles based on the centroid vertex and pairs of the plurality of vertices; and voxelize the triangles to determine voxels representing the portion of the point cloud.

22. The non-transitory computer-readable medium of claim 21, wherein the instructions, when executed, further configure the computing device to:

render, based on at least one voxel of the voxels, a point cloud frame associated with the portion of the point cloud.

23. The non-transitory computer-readable medium of claim 21, wherein the weight is based on distances between the vertex and each of the neighboring vertices.

24. The non-transitory computer-readable medium of claim 21, wherein the weight of each vertex is proportional to a mean or a sum of areas of two triangles, of the triangles, associated with the vertex.

25. A computing device comprising:

one or more processors; and memory storing instructions that, when executed by the one or more processors, cause the computing device to:

determine a plurality of vertices of a cuboid associated with a portion of a point cloud associated with content;

determine a centroid vertex of the cuboid based on a weighted sum of the plurality of vertices, wherein each vertex of the plurality of vertices has a weight based on neighboring vertices, of the plurality of vertices, of the vertex;

determine triangles based on the centroid vertex and pairs of the plurality of vertices; and voxelize the triangles to determine voxels representing the portion of the point cloud.

26. The computing device of claim 25, wherein the instructions, when executed by the one or more processors, further cause the computing device to:

render, based on at least one voxel of the voxels, a point cloud frame associated with the portion of the point cloud.

27. The computing device of claim 25, wherein the weight is based on distances between the vertex and each of the neighboring vertices.

28. The computing device of claim 25, wherein the weight of each vertex is proportional to a mean or a sum of areas of two triangles, of the triangles, associated with the vertex.

29. A non-transitory computer-readable medium storing instructions that, when executed, configure a computing device to:

determine a plurality of vertices of a cuboid associated with a portion of a point cloud associated with content;

determine a centroid vertex of the cuboid based on a weighted sum of the plurality of vertices, wherein each vertex of the plurality of vertices has a weight based on neighboring vertices, of the plurality of vertices, of the vertex;

determine a centroid residual based on the centroid vertex and the portion of the point cloud, wherein each of triangles comprises a triple of vertices, of the plurality of vertices, comprising a second centroid vertex and different adjacent vertices; and encode the centroid residual in a bitstream.

30. The non-transitory computer-readable medium of claim 29, wherein the instructions, when executed, further configure the computing device to:

determine triangles based on the centroid vertex and pairs of the plurality of vertices; and calculate a normalized vector based on an average normal of the triangles, wherein the centroid residual is along the normalized vector.

31. The non-transitory computer-readable medium of claim 29, wherein the instructions, when executed, further configure the computing device to:

based on an average of a set of points, in the portion of the point cloud, within a threshold distance of a line extending from both ends of a normalized vector, determine the second centroid vertex along the normalized vector, wherein the centroid residual comprises a difference between the second centroid vertex and the centroid vertex.

32. The non-transitory computer-readable medium of claim 29, wherein the instructions, when executed, further configure the computing device to encode the centroid residual in the bitstream comprising encoding a first indication of whether the centroid residual is equal to zero.

33. A computing device comprising:

one or more processors; and memory storing instructions that, when executed by the one or more processors, cause the computing device to:

determine a plurality of vertices of a cuboid associated with a portion of a point cloud associated with content;

determine a centroid vertex of the cuboid based on a weighted sum of the plurality of vertices, wherein each vertex of the plurality of vertices has a weight based on neighboring vertices, of the plurality of vertices, of the vertex;

determine a centroid residual based on the centroid vertex and the portion of the point cloud, wherein each of triangles comprises a triple of vertices, of the plurality of vertices, comprising a second centroid vertex and different adjacent vertices; and encode the centroid residual in a bitstream.

34. The computing device of claim 33, wherein the instructions, when executed by the one or more processors, further cause the computing device to:

determine triangles based on the centroid vertex and pairs of the plurality of vertices; and calculate a normalized vector based on an average normal of the triangles, wherein the centroid residual is along the normalized vector.

35. The computing device of claim 33, wherein the instructions, when executed by the one or more processors, further cause the computing device to:

based on an average of a set of points, in the portion of the point cloud, within a threshold distance of a line extending from both ends of a normalized vector, determine the second centroid vertex along the normalized vector, wherein the centroid residual comprises a difference between the second centroid vertex and the centroid vertex.

36. The computing device of claim 33, wherein the instructions, when executed by the one or more processors, further cause the computing device to encode the centroid residual in the bitstream comprising encoding a first indication of whether the centroid residual is equal to zero.

37. A non-transitory computer-readable medium storing instructions that, when executed, configure a computing device to:

determine a plurality of vertices of a cuboid associated with a portion of a point cloud associated with content;

determine a centroid vertex of the cuboid based on a weighted sum of the plurality of vertices, wherein each vertex of the plurality of vertices has a respective weight, of a plurality of weights, based on neighboring vertices, of the plurality of vertices, of the vertex;

determine, based on the centroid vertex and the portion of the point cloud, a centroid residual; and code the centroid residual in a bitstream.

38. The non-transitory computer-readable medium of claim 37, wherein the instructions, when executed, further configure the computing device to:

determine a plurality of triangles based on the centroid vertex and pairs of the plurality of vertices; and calculate a normalized vector based on an average normal of the plurality of triangles, wherein the centroid residual is along the normalized vector.

39. The non-transitory computer-readable medium of claim 37, wherein the instructions, when executed, further configure the computing device to code the centroid residual in the bitstream comprising coding an indication of whether the centroid residual is equal to zero.

40. A computing device comprising:

one or more processors; and memory storing instructions that, when executed by the one or more processors, cause the computing device to:

determine a plurality of vertices of a cuboid associated with a portion of a point cloud associated with content;

determine a centroid vertex of the cuboid based on a weighted sum of the plurality of vertices, wherein each vertex of the plurality of vertices has a respective weight, of a plurality of weights, based on neighboring vertices, of the plurality of vertices, of the vertex;

determine, based on the centroid vertex and the portion of the point cloud, a centroid residual; and code the centroid residual in a bitstream.

41. The computing device of claim 40, wherein the instructions, when executed by the one or more processors, further cause the computing device to:

determine a plurality of triangles based on the centroid vertex and pairs of the plurality of vertices; and calculate a normalized vector based on an average normal of the plurality of triangles, wherein the centroid residual is along the normalized vector.

42. The computing device of claim 40, wherein the instructions, when executed by the one or more processors, further cause the computing device to code the centroid residual in the bitstream comprising coding an indication of whether the centroid residual is equal to zero.

* * * * *